US010887117B2

United States Patent
Cao et al.

(10) Patent No.: US 10,887,117 B2
(45) Date of Patent: Jan. 5, 2021

(54) POWERED DEVICE USED FOR POWER OVER ETHERNET

(71) Applicant: Huawei Technologies Co., Ltd., Shenzhen (CN)

(72) Inventors: Jincan Cao, Nanjing (CN); Yonghuan Ding, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/422,268

(22) Filed: May 24, 2019

(65) Prior Publication Data

US 2019/0372788 A1     Dec. 5, 2019

(30) Foreign Application Priority Data

May 30, 2018    (CN) ........................ 2018 1 0541621

(51) Int. Cl.
    *H04L 12/10*       (2006.01)
    *H02M 7/217*     (2006.01)

(52) U.S. Cl.
    CPC ............ *H04L 12/10* (2013.01); *H02M 7/217* (2013.01)

(58) Field of Classification Search
    CPC ................ G06F 1/266; H02M 3/33592; H04L 12/40045; H04L 25/02; H04L 25/0266
See application file for complete search history.

(56) References Cited

U.S. PATENT DOCUMENTS

| 6,212,084 | B1 * | 4/2001 | Turner | .............. H02M 3/33592 |
|---|---|---|---|---|
| | | | | 363/127 |
| 7,417,443 | B2 * | 8/2008 | Admon | ................... H04L 12/10 |
| | | | | 324/522 |

(Continued)

FOREIGN PATENT DOCUMENTS

| CN | 201639476 U | 11/2010 |
|---|---|---|
| CN | 102164039 A | 8/2011 |

(Continued)

OTHER PUBLICATIONS

"Part 3: Carrier Sense Multiple Access with Collision Detection (CSMA/CD) Access Method and Physical Layer Specifications, Amendment 3: Data Terminal Equipment (DTE) Power via the Media Dependent Interface (MDI) Enhancements," IEEE Std 802.3at™, Oct. 30, 2009, 141 pages.

(Continued)

*Primary Examiner* — Thomas J. Hiltunen
(74) *Attorney, Agent, or Firm* — Conley Rose, P.C.

(57) ABSTRACT

A powered device (PD) used for power over Ethernet (PoE), where the PD includes an Ethernet port and a rectifier circuit. The rectifier circuit includes a first control circuit and a second control circuit, where the first control circuit is configured to control a first metal-oxide semiconductor field-effect transistor (MOSFET) and a second MOSFET, avoid turning on the first MOSFET and the second MOSFET at a PoE detection stage, and turn on at least one of the first MOSFET or the second MOSFET at a PoE power supply stage. The second control circuit is configured to control a third MOSFET and a fourth MOSFET, turn on at least one of the third MOSFET or the fourth MOSFET at the PoE power supply stage, and avoid turning on the third MOSFET and the fourth MOSFET at the PoE detection stage.

20 Claims, 6 Drawing Sheets

(56) References Cited

U.S. PATENT DOCUMENTS

| | | | |
|---|---|---|---|
| 7,490,251 B2* | 2/2009 | Lum | H04L 12/10 340/12.32 |
| 7,685,452 B2* | 3/2010 | Camagna | H04L 12/10 330/291 |
| 7,921,308 B2* | 4/2011 | Dhuyvetter | H04L 12/10 363/65 |
| 7,973,538 B2* | 7/2011 | Karam | H04L 12/10 324/539 |
| 9,231,402 B2* | 1/2016 | Landry | H02H 9/041 |
| 9,472,950 B2* | 10/2016 | Zhou | H04L 12/10 |
| 9,485,103 B2* | 11/2016 | Wright | H04L 12/10 |
| 9,509,227 B2* | 11/2016 | Yedinak | H02M 7/06 |
| 10,594,229 B2* | 3/2020 | Cao | H02M 7/217 |
| 2006/0164108 A1* | 7/2006 | Herbold | H04L 12/10 324/691 |
| 2007/0171690 A1* | 7/2007 | Apfel | H02M 7/23 363/127 |
| 2011/0202784 A1 | 8/2011 | Mizutani | |
| 2011/0283118 A1* | 11/2011 | Maniktala | G06F 1/266 713/300 |
| 2012/0303981 A1 | 11/2012 | Heath et al. | |
| 2014/0084681 A1 | 3/2014 | Vigna et al. | |
| 2014/0164795 A1 | 6/2014 | Wright et al. | |
| 2017/0288535 A1* | 10/2017 | Wendt | H02H 11/002 |
| 2018/0139063 A1 | 5/2018 | Yseboodt et al. | |

FOREIGN PATENT DOCUMENTS

| | | |
|---|---|---|
| CN | 107864693 A | 3/2018 |
| EP | 2728793 A2 | 5/2014 |
| EP | 2903205 A1 | 8/2015 |

OTHER PUBLICATIONS

"Part 3: Carrier Sense Multiple Access with Collision Detection (CSMA/CD) Access Method and Physical Layer Specifications, Amendment: Data Terminal Equipment (DTE) Power via Media Dependent Interface (MDI)," IEEE Std 302.3af™, Jun. 18, 2003, 133 pages.

"Draft Standard for Ethernet Amendment: Physical Layer and Management Parameters for DTE Power via MDI over 4-Pair," IEEE P802.3bt™/D2.2, Nov. 28, 2016, 280 pages.

Foreign Communication From a Counterpart Application, European Application No. 19176873.8, Extended European Search Report dated Aug. 20, 2019, 7 pages.

* cited by examiner

POWERED DEVICE USED FOR POWER OVER ETHERNET

CROSS-REFERENCE TO RELATED APPLICATION

This application claims priority to Chinese Patent Application No. 201810541621.9, filed on May 30, 2018, which is hereby incorporated by reference in its entirety.

TECHNICAL FIELD

The present disclosure relates to the communications field, and in particular, to a powered device used for power over Ethernet (PoE).

BACKGROUND

A PoE system includes a power sourcing equipment (PSE) and a powered device (PD). The PSE can supply power to the PD while communicating with the PD through an Ethernet cable. The Ethernet cable is also referred to as an Ethernet twisted pair, and includes eight wires numbered 1 to 8. Wire 1 and wire 2 are paired, and referred to as wire pair 1-2. Wire 3 and wire 6 are paired, and referred to as wire pair 3-6. Wire 4 and wire 5 are paired, and referred to as wire pair 4-5. Wire 7 and wire 8 are paired, and referred to as wire pair 7-8. Two paired wires are twisted together. In a widely used 100 M Ethernet, the wire pair 1-2 and the wire pair 3-6 are used for communication, and the wire pair 4-5 and the wire pair 7-8 are idle.

Two wire pairs, that is, a data wire pair group (the wire pair 1-2 and the wire pair 3-6), are generally used for original power over Ethernet supply. With development of Ethernet power supply technologies, four wire pairs can be used in new power over Ethernet supply. FIG. 1 is a structural diagram of a PD. The PD can work normally when early power supply performed by using two wire pairs. However, in a high-power PoE scenario in which four wire pairs are used for power supply, a rectifier circuit causes a detection error, and consequently the PD cannot be powered on.

SUMMARY

This application provides a powered device used for PoE. An added control circuit controls a rectifier circuit based on a voltage threshold, in order to resolve a problem that the PD cannot be normally powered on due to a detection error in a high-power power supply scenario in which four wire pairs are used.

According to a first aspect, a PD is provided, and the PD includes an Ethernet port, a rectifier circuit, and a PD circuit, where the Ethernet port is connected to the rectifier circuit. The rectifier circuit is connected to the PD circuit, and the Ethernet port includes a first contact group and a second contact group. The rectifier circuit includes a first metal-oxide semiconductor field-effect transistor (MOSFET), a second MOSFET, a third MOSFET, and a fourth MOSFET. The rectifier circuit further includes a first control circuit and a second control circuit. The first control circuit is configured to skip turning on the first MOSFET and the second MOSFET when a first voltage is less than a first voltage threshold, and further configured to turn on at least one of the first MOSFET or the second MOSFET when the first voltage is greater than the first voltage threshold, where the first voltage is a voltage input from the first contact group.

The second control circuit is configured to turn on at least one of the third MOSFET or the fourth MOSFET when a second voltage is greater than a second voltage threshold. The second control circuit is further configured to skip turning on the third MOSFET and the fourth MOSFET when the first voltage is less than the second voltage threshold, where the second voltage is a voltage input from the second contact group.

In the foregoing PD, the first control circuit and the second control circuit are added to the rectifier circuit. At a detection stage, the first control circuit controls the first MOSFET and the second MOSFET not to be turned on, and the second control circuit controls the third MOSFET and the fourth MOSFET not to be turned on, in order to avoid that a reflected voltage causes a detection error. At a power supply stage, the first control circuit controls the first MOSFET or the second MOSFET to be turned on, and the second control circuit controls the third MOSFET or the fourth MOSFET to be turned on, in order to reduce a power loss.

In a first possible implementation of the first aspect, the first control circuit is further configured to skip turning on the first MOSFET and the second MOSFET when the second voltage is less than the first voltage threshold.

With reference to the first aspect or the first possible implementation of the first aspect, in a second possible implementation of the first aspect, the second control circuit is further configured to skip turning on the third MOSFET and the fourth MOSFET when the second voltage is less than the second voltage threshold.

In some PoE systems, PSE can not only perform a detection operation by using a wire pair group (a group including a wire pair 1-2 and a wire pair 3-6), but also perform a detection operation by using the other wire pair group (a group including a wire pair 4-5 and a wire pair 7-8). Therefore, the first control circuit also needs to determine whether the second voltage is less than the first voltage threshold, and the second control circuit also needs to determine whether the second voltage is less than the second voltage threshold, to ensure that the detection operations can be correctly performed.

With reference to the first aspect or the first or the second possible implementation of the first aspect, in a third possible implementation of the first aspect, the first contact group includes a first contact pair and a second contact pair. The second contact group includes a third contact pair and a fourth contact pair. The first voltage is an electric potential difference between the first contact pair and the second contact pair, and the second voltage is an electric potential difference between the third contact pair and the fourth contact pair. The rectifier circuit further includes a first diode, a second diode, a third diode, and a fourth diode. The first control circuit includes a first control subcircuit and a second control subcircuit, and the second control circuit includes a third control subcircuit and a fourth control subcircuit. The first contact pair is connected to a drain electrode of the first MOSFET, and is connected to a first end of the first diode. The second contact pair is connected to a drain electrode of the second MOSFET, and is connected to a first end of the second diode. The third contact pair is connected to a drain electrode of the third MOSFET, and is connected to a first end of the third diode. The fourth contact pair is connected to a drain electrode of the fourth MOSFET, and is connected to a first end of the fourth diode. A gate electrode of the first MOSFET is connected to a second end of the first control subcircuit, and a source electrode of the first MOSFET is connected to a first end of the first control subcircuit. A gate electrode of the second MOSFET is connected to a second end of the second control subcircuit, and a source electrode of the second MOSFET is connected to a first end of the second control subcircuit. A gate electrode of the third MOSFET is connected to a second end of the third control subcircuit, and a source electrode of the third MOSFET is connected to a first end of the third control subcircuit. A gate electrode of the fourth MOSFET is connected to a second end of the fourth control subcircuit, and a source electrode of the fourth MOSFET is connected to a first end of the fourth control subcircuit. A first power input end of the PD circuit is connected to the source electrode of the first MOSFET, the source electrode of the second MOSFET, the source electrode of the third MOSFET, and the source electrode of the fourth MOSFET. A second power input end of the PD circuit is connected to a second end of the first diode, a second end of the second diode, a second end of the third diode, and a second end of the fourth diode. A third end of the first control subcircuit is connected to the second contact pair. A third end of the second control subcircuit is connected to the first contact pair, a third end of the third control subcircuit is connected to the fourth contact pair, and a third end of the fourth control subcircuit is connected to the third contact pair. The first control subcircuit is configured such that when making an electric potential difference between the third end of the first control subcircuit and the first end of the first control subcircuit less than the first voltage threshold, the first control subcircuit makes an electric potential difference between the gate electrode of the first MOSFET and the source electrode of the first MOSFET less than a critical voltage of the first MOSFE. The second control subcircuit is configured such that when making an electric potential difference between the third end of the second control subcircuit and the first end of the second control subcircuit less than the first voltage threshold, the second subcircuit makes an electric potential difference between the gate electrode of the second MOSFET and the source electrode of the second MOSFET less than a critical voltage of the second MOSFET. The third control subcircuit is configured such that when making an electric potential difference between the third end of the third control subcircuit and the first end of the third control subcircuit less than the second voltage threshold, the third control subcircuit makes an electric potential difference between the gate electrode of the third MOSFET and the source electrode of the third. MOSFET less than a critical voltage of the third MOSFET. The fourth control subcircuit is configured such that when making an electric potential difference between the third end of the fourth control subcircuit and the first end of the fourth control subcircuit less than the second voltage threshold, the fourth control subcircuit makes an electric potential difference between the gate electrode of the fourth MOSFET and the source electrode of the fourth MOS FET less than a critical voltage of the fourth MOSFET.

In the rectifier circuit of the foregoing PD, a gate electrode of each MOSFET is connected to a control subcircuit. Each control subcircuit controls, based on a voltage threshold, a corresponding MOSFET to be turned on or not to be turned on. This can ensure that a detection operation is correctly performed at the detection stage, and a power loss is reduced at the power supply stage.

With reference to the third possible implementation of the first aspect, in a fourth possible implementation of the first aspect, the first control subcircuit includes a first resistor and a second resistor, where a first end of the first resistor is connected to the first contact pair. Both a second end of the first resistor and a first end of the second resistor are connected to the gate electrode of the second MOSFET, and a second end of the second resistor is connected to the source electrode of the second MOSFET. The second control subcircuit includes a third resistor and a fourth resistor, where a first end of the third resistor is connected to the second contact pair. Both a second end of the third resistor and a first end of the fourth resistor are connected to the gate electrode of the first MOSFET, and a second end of the fourth resistor is connected to the source electrode of the first MOSFET. The third control subcircuit includes a fifth resistor and a sixth resistor, where a first end of the fifth resistor is connected to the third contact pair. Both a second end of the fifth resistor and a first end of the sixth resistor are connected to the gate electrode of the fourth MOSFET, and a second end of the sixth resistor is connected to the source electrode of the fourth MOSFET. The fourth control subcircuit includes a seventh resistor and an eighth resistor, where a first end of the seventh resistor is connected to the fourth contact pair. Both a second end of the seventh resistor and a first end of the eighth resistor are connected to the gate electrode of the third MOSFET, and a second end of the eighth resistor is connected to the source electrode of the third MOSFET. Resistance values of the first resistor and the second resistor satisfy the following conditions: $R1*V_D/(R1+R2)<V_{th1}$, and $R1*V_{PoE}/(R1+R2)>V_{th1}$, where R1 is a resistance value of the first resistor, R2 is a resistance value of the second resistor, $V_{th1}$ is the critical voltage of the first MOSFET, $V_D$ is an absolute value of a maximum PoE detection voltage, and $V_{PoE}$ is an absolute value of a minimum PoE supply voltage. Resistance values of the third resistor and the fourth resistor satisfy the following conditions: $R3*V_D/(R3+R4)<V_{th2}$, and $R3*V_{PoE}/(R3+R4)>V_{th2}$, where R3 is a resistance value of the third resistor, R4 is a resistance value of the fourth resistor, and $V_{th2}$ is the critical voltage of the second MOSFET. Resistance values of the fifth resistor and the sixth resistor satisfy the following conditions: $R5*V_D/(R5+R6)<V_{th3}$, and $R5*V_{PoE}/(R5+R6)>V_{th3}$, where R5 is a resistance value of the fifth resistor, R6 is a resistance value of the sixth resistor, and $V_{th3}$ is the critical voltage of the third MOSFET. Resistance values of the seventh resistor and the eighth resistor satisfy the following conditions: $R7*V_D/(R7+R8)<V_{th4}$, and $R7*V_{PoE}/(R7+R8)>V_{th4}$, where R7 is a resistance value of the seventh resistor, R8 is a resistance value of the eighth resistor, and $V_{th4}$ is the critical voltage of the fourth MOSFET.

In the rectifier circuit of the foregoing PD, each control subcircuit is implemented by using two resistors. In addition, a resistance value is set based on purposes that a reflected voltage cannot be generated at the detection stage and that a power loss is reduced at the power supply stage by using a MOSFET.

With reference to the third possible implementation of the first aspect, in a fifth possible implementation of the first aspect, the first control subcircuit includes a first break-over diode, where a negative electrode of the first break-over diode is connected to the second contact pair, and a positive electrode of the first break-over diode is connected to the gate electrode of the first MOSFET. The second control subcircuit further includes a second break-over diode, where a negative electrode of the second break-over diode is connected to the first contact pair, and a positive electrode of the second break-over diode is connected to the gate electrode of the second MOSFET. The third control subcircuit further includes a third break-over diode, where a negative electrode of the third break-over diode is connected to the fourth contact pair, and a positive electrode of the third break-over diode is connected to the gate electrode of the third MOSFET. The fourth control subcircuit further includes a fourth break-over diode, where a negative electrode of the fourth break-over diode is connected to the third contact pair, and a positive electrode of the fourth break-over diode is connected to the gate electrode of the fourth MOSFET. Both a critical voltage of the first break-over diode and a critical voltage of the second break-over diode are the first voltage threshold. Both a critical voltage of the third break-over diode and a critical voltage of the fourth break-over diode are the second voltage threshold.

In the rectifier circuit of the foregoing PD, each control subcircuit is implemented by using a break-over diode, and a critical voltage of the break-over diode is set as a voltage threshold, to control a MOSFET not to be turned on at the detection stage and to be turned on at the power supply stage. Therefore, it is ensured that a reflected voltage is not generated at the detection stage and a detection result is accurate and that a power loss is reduced at the power supply stage through MOSFET rectification.

With reference to the fifth possible implementation of the first aspect, in a sixth possible implementation of the first aspect, the first control subcircuit further includes a first resistor and a second resistor, a first end of the first resistor is connected to the positive electrode of the first break-over diode, both a second end of the first resistor and a first end of the second resistor are connected to the gate electrode of the first MOSFET, and a second end of the second resistor is connected to the source electrode of the first MOSFET. Resistance values of the first resistor and the second resistor satisfy $R1*V_{PoE}/(R1+R2) > V_{th1}$, where $V_{PoE}$ is an absolute value of a minimum PoE supply voltage, $V_{th1}$ is the critical voltage of the MOSFET 1, R1 is a resistance value of the first resistor, and R2 is a resistance value of the second resistor. The second control subcircuit further includes third resistor and fourth resistor, a first end of the third resistor is connected to the positive electrode of the second break-over diode, both a second end of the third resistor and a first end of the fourth resistor are connected to the gate electrode of the second. MOSFET, and a second end of the second resistor is connected to the source electrode of the second MOSFET. Resistance values of the third resistor and the fourth resistor satisfy $R3*V_{PoE}/(R3+R4) > V_{th2}$, where $V_{th2}$ is the critical voltage of the second MOSFET, R3 is a resistance value of the third resistor, and R4 is a resistance value of the fourth resistor. The third control subcircuit further includes fifth resistor and sixth resistor, a first end of the fifth resistor is connected to the positive electrode of the third break-over diode, both a second end of the fifth resistor and a first end of the sixth resistor are connected to the gate electrode of the third MOSFET, and a second end of the sixth resistors connected to the source electrode of the third MOSFET. Resistance values of the fifth resistor and the sixth resistor satisfy $R5*V_{PoE}/(R5+R6) > V_{th3}$, where $V_{th3}$ is the critical voltage of the third MOSFET, R5 is a resistance value of the third resistor, and R6 is a resistance value of the fourth resistor. The fourth control subcircuit further includes a seventh resistor and a eighth resistor, a first end of the seventh resistor is connected to the positive electrode of the fourth break-over diode, both a second end of the seventh resistor and a first end of the eighth resistor are connected to the gate electrode of the fourth MOSFET, and a second end of the eighth resistor is connected to the source electrode of the fourth MOSFET. Resistance values of the seventh resistor and the eighth resistor satisfy $R7*V_{PoE}/(R7+R8) > V_{th4}$, where $V_{th4}$ is the critical voltage of the fourth MOSFET, R5 is a resistance value of the third resistor, and R6 is a resistance value of the fourth resistor.

According to a second aspect, a power supply system is provided, and includes a power supply device and the powered device according to any one of the foregoing first aspect and the possible implementations of the foregoing first aspect, where the power supply device is connected to the powered device through an Ethernet cable.

DESCRIPTION OF EMBODIMENTS

Figure 1:
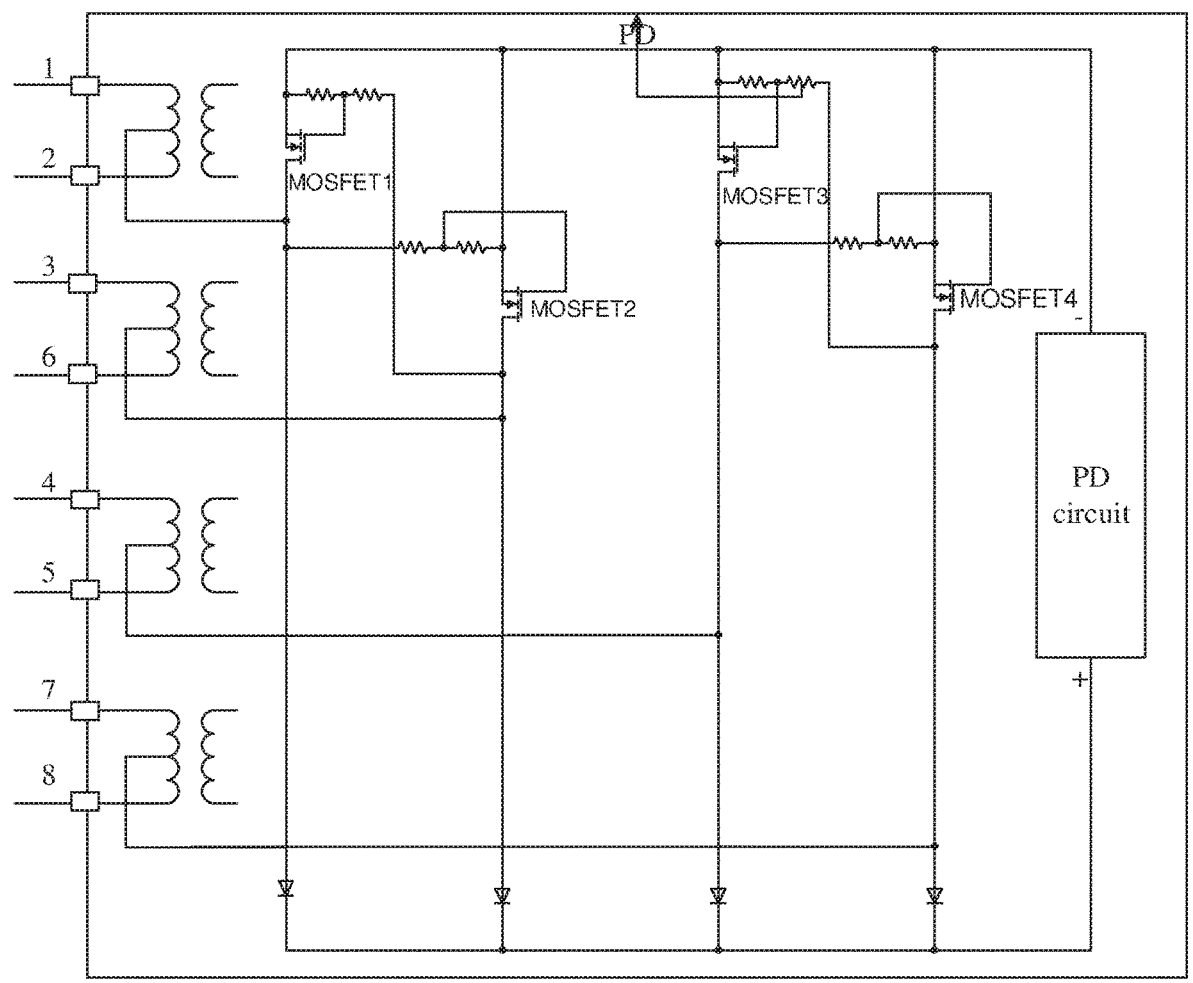
FIG. 1 is a schematic structural diagram of a PD.

The following describes technical solutions of the present disclosure with reference to accompanying drawings and implementations.

Usually, an Ethernet port includes eight contacts numbered 1 to 8, and these eight contacts are respectively configured to connect to a wire 1 to a wire 8 in an Ethernet cable. Contact 1 and contact 2 are paired, and are referred to as contact pair 1-2. A contact 3 and a contact 6 are paired, and are referred to as a contact pair 3-6. A contact 4 and a contact 5 are paired, and are referred to as a contact pair 4-5. A contact 7 and a contact 8 are paired, and are referred to as a contact pair 7-8. The contact pair 1-2 is configured to connect to a wire pair 1-2 of the Ethernet cable; the contact pair 3-6 is configured to connect to a wire pair 3-6 of the Ethernet cable; the contact pair 4-5 is configured to connect to a wire pair 4-5 of the Ethernet cable; and the contact pair 7-8 is configured to connect to a wire pair 7-8 of the Ethernet cable. A first contact group includes the contact pair 1-2 and the contact pair 3-6, and a second contact group includes the contact pair 4-5 and the contact pair 7-8. A first wire pair group includes the wire pair 1-2 and the wire pair 3-6, and a second wire pair group includes the wire pair 4-5 and the wire pair 7-8.

When a PSE uses the first wire pair group for power supply, regardless of which contact pair in the first contact group has a low electric potential, a current flows through a. MOSFET and a diode in a rectifier circuit. Similarly, when the PSE uses the second wire pair group for power supply, regardless of which contact pair in the second contact group has a low electric potential, a current flows through a MOSFET and a diode in the rectifier circuit. In this way, at a PoE power supply stage, because a power loss of a MOSFET is far lower than that of a diode, a power loss of the rectifier circuit can be reduced.

If the PSE uses only one wire pair group at a detection or classification stage to send a detection or classification voltage, the PSE should not receive, from the other wire pair group, a voltage that is sufficient to affect a detection or classification result. For example, if the PSE provides a negative electric potential by using the wire pair 1-2 and uses the wire pair 3-6 as a backflow wire pair, MOSFET 1 in FIG. 1 is turned on. If the wire pair 4-5 and the wire pair 7-8 in the PSE are unconnected, the PSE does not receive a voltage from a group including the wire pair 4-5 and the wire pair 7-8. However, if the wire pair 4-5 is connected to a backflow end (that is, connected to the wire pair 3-6) in the PSE, a high electric potential of the wire pair 4-5 makes MOSFET 4 turned on, and the turned-on MOSFET 4 guides a low electric potential to the wire pair 7-8. Therefore, the first PSE receives a voltage from the second wire pair group. The voltage may be referred to as a reflected voltage. The reflected voltage may cause a detection error.

Therefore, in the present disclosure, a gate electrode of a MOSFET is connected to a control circuit, which turns on or does not turn on the MOSFET based on a voltage threshold, in order to avoid generating a reflected voltage on a wire pair group when a detection or classification voltage is sent by using the other wire pair group. This resolves a problem that a PD cannot be normally powered on due to a detection or classification error.

Figure 2:
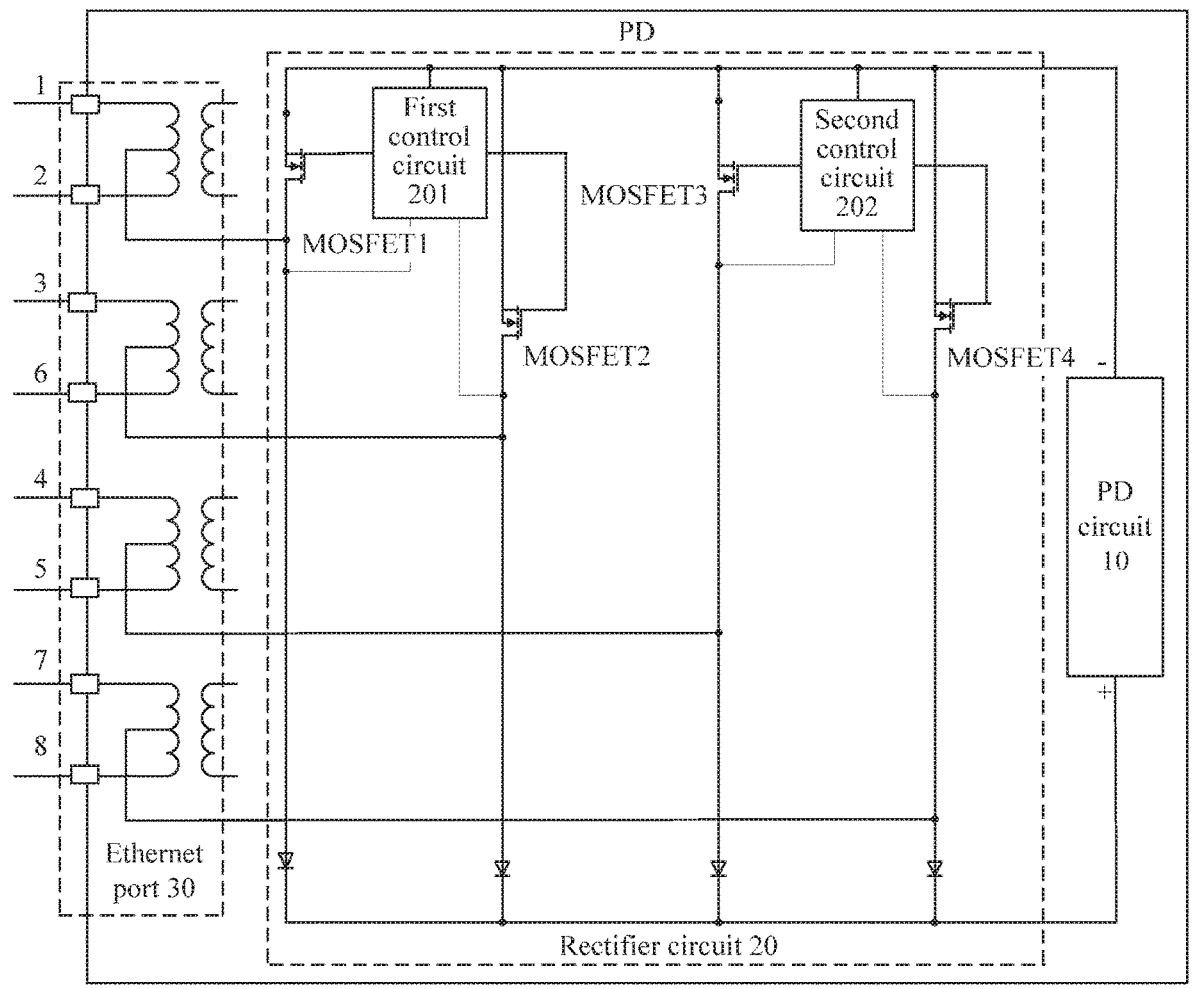
FIG. 2 is a structural diagram of a PD according to an embodiment of the present disclosure.

FIG. 2 is a structural diagram of a PD according to an embodiment of the present disclosure. The PD includes a PD circuit 10, a rectifier circuit 20, and an Ethernet port 30. The Ethernet port 30 is connected to the rectifier circuit 20, and the rectifier circuit 20 is connected to the PD circuit 10.

The PD circuit 10 includes at least one PD chip. The PD chip is configured to implement a PD function in processes such as PoE detection and classification. The PD circuit 10 stay further include a direct current-direct current (DC-DC) convertor. The PD circuit 10 stay further include a PD load. A power input positive electrode (+) of the PD circuit 10 receives a high electric potential, and a power input negative, (−) of the PD circuit 10 receives a low electric potential.

The Ethernet port 30 includes a first contact group and a second contact group. The first contact group includes a first contact pair (for example, a contact pair 1-2) and a second contact pair (for example, a contact pair 3-6). The second contact group includes a third contact pair (for example, a contact pair 4-5) and a fourth contact pair (for example, a contact pair 7-8). The contact pair 1-2 is configured to connect to a wire pair 1-2 of an Ethernet cable; the contact pair 3-6 is configured to connect to a wire pair 3-6 of the Ethernet cable; the contact pair 4-5 is configured to connect to a wire pair 4-5 of the Ethernet cable; and the contact pair 7-8 is configured to connect to a wire pair 7-8 of the Ethernet cable.

The rectifier circuit 20 includes MOSFET 1, MOSFET 2, MOSFET 3, and MOSFET 4.

The rectifier circuit 20 further includes a first control circuit 201 and a second control circuit 202.

The first control circuit 201 is configured to: skip turning on the MOSFET 1 and the MOSFET 2 when a first voltage input from the first contact group is less than a first voltage threshold; and turn on at least one of the MOSFET 1 or the MOSFET 2 when the first voltage is greater than the first voltage threshold.

The second control circuit 202 is configured to: turn on at least one of the MOSFET 3 or the MOSFET 4 when a second voltage input from the second contact group is greater than a second voltage threshold; and skip turning on the MOSFET 3 and the MOSFET 4 when the first voltage is less than the second voltage threshold.

Because a negative electric potential is generally used for power supply in PoE, in this embodiment of the present disclosure, that a voltage input from a contact group is greater than a voltage threshold means that an absolute value of the voltage input from the contact group is greater than that of the voltage threshold. The voltage threshold may be between a maximum PoE detection voltage and a minimum PoE supply voltage. The absolute value of the voltage threshold is greater than that of the maximum PoE detection voltage and less than or equal to an absolute value of the minimum PoE supply voltage. The absolute value of the voltage threshold may be greater than an absolute value of a maximum PoE classification voltage.

In an embodiment of the present disclosure, the first voltage threshold and the second voltage threshold may be the same or may be different.

In some PoE systems, PSE can not only perform a detection operation by using the first wire pair group, but also perform a detection operation by using the second wire pair group. Therefore, the first control circuit 201 is further configured to skip turning on the MOSFET 1 and the MOSFET 2 when the second voltage is less than the first voltage threshold; and the second control circuit 202 is further configured to skip turning on the MOSFET 3 and the MOSFET 4 when the second voltage is less than the second voltage threshold.

In an embodiment of the present disclosure, when the voltage of a contact group is equal to a voltage threshold, processing is performed according to one of the foregoing cases. That is, when the voltage of the contact group is equal to the voltage threshold, a MOSFET may be turned on or may not be turned on.

Figure 3:
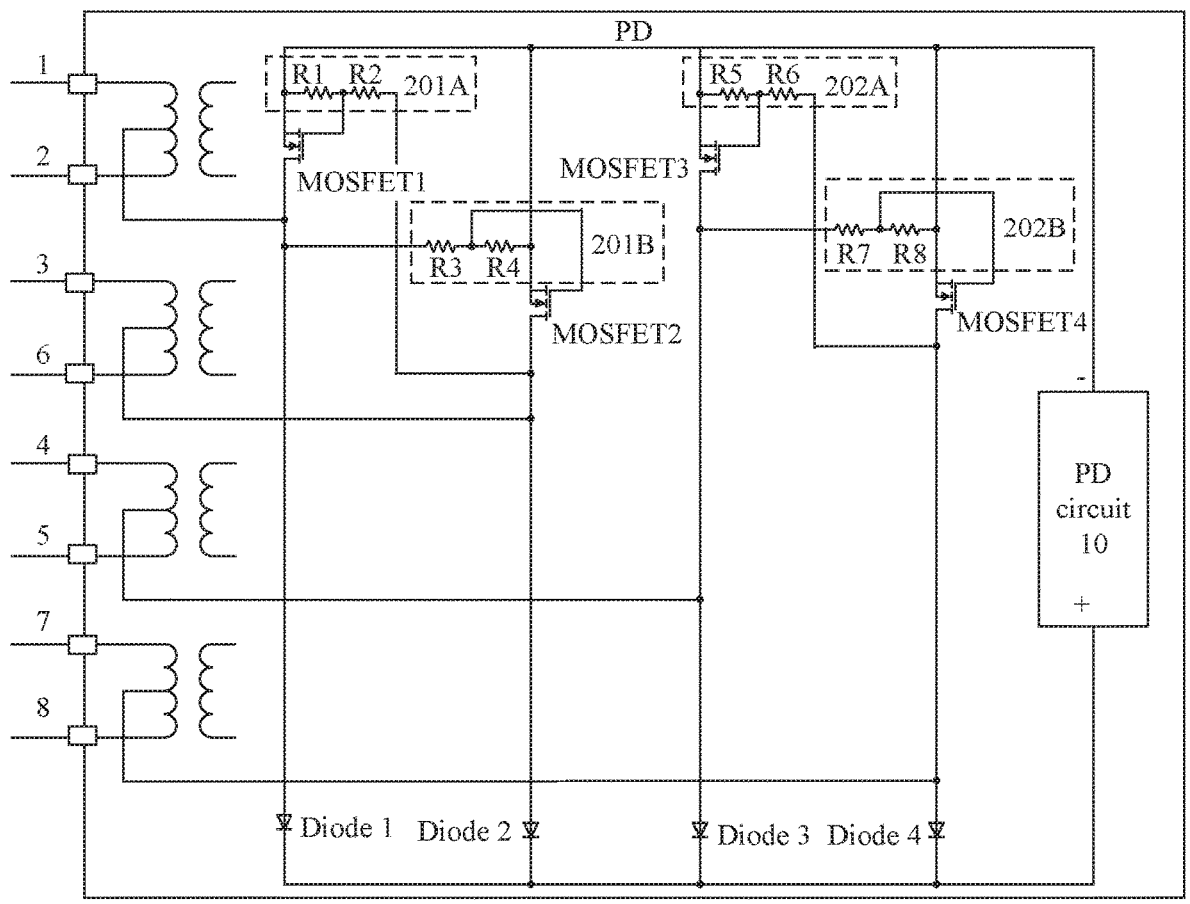
FIG. 3 is a schematic circuit diagram of a PD according to an embodiment of the present disclosure.

Based on the PD shown in FIG. 2, FIG. 3 is a schematic circuit diagram of a PD according to an embodiment of the present disclosure.

The rectifier circuit 20 includes MOSFET 1, MOSFET 2, MOSFET 3, and MOSFET 4.

The rectifier circuit 20 further includes diode 1, diode 2, diode 3, and diode 4.

The first control circuit 201 includes a first control subcircuit 201A and a second control subcircuit 201B, and the second control circuit 202 includes a third control subcircuit 202A and a fourth control subcircuit 202B.

The first contact group includes a first contact pair (the contact pair 1-2) and a second contact pair (the contact pair 3-6), and the second contact group includes a third contact pair (the contact pair 4-5) and a fourth contact pair (the contact pair 7-8).

The first voltage is an electric potential difference between the first contact pair and the second contact pair. The second voltage is an electric potential difference between the third contact pair and the fourth contact pair.

All four MOSFETs in FIG. 3 are implemented by N-type MOSFETs, for example, TK49N65W5 MOSFETs.

The first contact pair is connected to a drain electrode of the MOSFET 1, and is connected to a positive electrode (a first end) of the diode 1.

The second contact pair is connected to a drain electrode of the MOSFET 2, and is connected to a positive electrode (a first end) of the diode 2.

The third contact pair is connected to a drain electrode of the MOSFET 3, and is connected to a positive electrode (a first end) of the diode 3.

The fourth contact pair is connected to a drain electrode of the MOSFET 4, and is connected to a positive electrode (a first end) of the diode 4.

A source electrode of the MOSFET 1 is connected to a first end of the first control subcircuit 201A, and a gate electrode of the MOSFET 1 is connected to a second end of the first control subcircuit 201A.

A source electrode of the MOSFET 2 is connected to a first end of the second control subcircuit 201B, and a gate electrode of the MOSFET 2 is connected to a second end of the second control subcircuit 201B.

A source electrode of the MOSFET 3 is connected to a first end of the third control subcircuit 202A, and a gate electrode of the MOSFET 3 is connected to a second end of the third control subcircuit 202A.

A source electrode of the MOSFET 4 is connected to a first end of the fourth control subcircuit 202B, and a gate electrode of the MOSFET 4 is connected to a second end of the fourth control subcircuit 202B.

A third end of the first control subcircuit 201A is connected to the second contact pair.

A third end of the second control subcircuit 201B is connected to the first contact pair.

A third end of the third control subcircuit 202A is connected to the fourth contact pair.

A third end of the fourth control subcircuit 202B is connected to the third contact pair.

A first power input end (−) of the PD circuit 10 is connected to the source electrode of the MOSFET 1, the source electrode of the MOSFET 2, the source electrode of the MOSFET 3, and the source electrode of the MOSFET 4.

A second power input end (+) of the PD circuit 10 is connected to a negative electrode (a second end) of the diode 1, a negative electrode (a second end) of the diode 2, a negative electrode (a second end) of the diode 3, and a negative electrode (a second end) of the diode 4.

The first control subcircuit is configured to: when making an electric potential difference between the third end of the first control subcircuit and the first end of the first control subcircuit less than the first voltage threshold, make an electric potential difference between the gate electrode of the MOSFET 1 and the source electrode of the MOSFET 1 less than a critical voltage of the MOSFET 1, such that the MOSFET 1 is not turned on. In this way, at a detection stage, a case in which a reflected voltage is generated through the MOSFET 1 and causes a detection error is avoided.

The second control subcircuit is configured to: when making an electric potential difference between the third end of the second control subcircuit and the first end of the second control subcircuit less than the first voltage threshold, make an electric potential difference between the gate electrode of the MOSFET 2 and the source electrode of the MOSFET 2 less than a critical voltage of the MOSFET 2, such that the MOSFET 2 is not turned on. In this way, at the detection stage, a case in which a reflected voltage is generated through the MOSFET 2 and causes a detection error is avoided.

The third control subcircuit is configured to: when making an electric potential difference between the third end of the third control subcircuit and the first end of the third control subcircuit less than the second voltage threshold, make an electric potential difference between the gate electrode of the MOSFET 3 and the source electrode of the MOSFET 3 less than a critical voltage of the MOSFET 3, such that the MOSFET 3 is not turned on. In this way, at the detection stage, a case in which a reflected voltage is generated through the MOSFET 3 and causes a detection error is avoided.

The fourth control subcircuit is configured to: when making an electric potential difference between the third end of the fourth control subcircuit and the first end of the fourth control subcircuit less than the second voltage threshold, make an electric potential difference between the gate electrode of the MOSFET 4 and the source electrode of the MOSFET 4 less than a critical voltage of the MOSFET 4, such that the MOSFET 4 is not turned on. In this way, at the detection stage, a case in which a reflected voltage is generated through the MOSFET 4 and causes a detection error is avoided.

FIG. 3 shows only a structure of the rectifier circuit in this embodiment of the present disclosure. Some components other than the MOSFETs, for example, a capacitor, a resistor, and a bipolar junction transistor (BJT), may be added to the rectifier circuit 20.

In FIG. 3, two resistors that are connected in series between contact pairs are used as a control circuit. A MOSFET in FIG. 3 is a power MOSFET. A power MOSFET generally has a parasitic body diode. A positive electrode of the body diode is a source electrode of the power MOSFET, and a negative electrode of the body diode is a drain electrode of the power MOSFET.

Because critical voltages (also referred to as cut-in voltages) of MOSFETs of different specifications are different, a control circuit provided in this embodiment of the present disclosure may be implemented based on a voltage threshold and a critical voltage of a MOSFET by setting resistance values of two resistors in each control subcircuit, such that when a voltage input from a contact group is less than the voltage threshold, the MOSFET is not turned on; and when the voltage input from the contact group is greater than the voltage threshold, a corresponding MOSFET is turned on.

As shown in FIG. 3, the first control subcircuit 201A includes resistor R1 and a resistor R2. Resistance values of the resistor R1 and the resistor R2 satisfy the following conditions: $R1*V_D/(R1+R2)<V_{th1}$, and $R1*V_{PoE}/(R1+R2)>V_{th1}$, where $V_D$ is an absolute value of a maximum PoE detection voltage; $V_{PoE}$ is an absolute value of a minimum PoE supply voltage; and $V_{th1}$ is the critical voltage of the MOSFET 1.

A first end of the resistor R1 is connected to the third end (that is, connected to the second contact pair) of the first control subcircuit 201A. A second end of the resistor R1 and a first end of the resistor R2 are connected to the second end (that is, connected to the gate electrode of the MOSFET 1) of the first control subcircuit 201A, and a second end of the resistor R2 is connected to the first end (that is, connected to the source electrode of the MOSFET 1) of the first control subcircuit 201A.

The second control subcircuit 201B includes resistor R3 and resistor R4. Resistance values of the resistor R3 and the resistors R4 satisfy the following conditions: $R3*V_D/(R3+R4)<V_{th2}$, and $R3*V_{PoE}/(R3+R4)>V_{th2}$, where $V_{th2}$ is the critical voltage of the MOSFET 2.

A first end of the resistor R3 is connected to the third end (that is, connected to the first contact pair) of the second control subcircuit 201B. A second end of the resistor R3 and a first end of the resistor R4 are connected to the second end (that is, connected to the gate electrode of the MOSFET 2) of the second control subcircuit 201B, and a second end of the resistor R4 is connected to the first end (that is, connected to the source electrode of the MOSFET 2) of the second control subcircuit 201B.

The third control subcircuit 202A includes resistor R5 and resistor R6. Resistance values of the resistor R5 and the resistor R6 satisfy the following conditions: $R5*V_D/(R5+R6)<V_{th3}$, and $R5*V_{PoE}/(R5+R6)>V_{th3}$, where $V_3$ is the critical voltage of the MOSFET 3.

A first end of the resistor R5 is connected to the third end (that is, connected to the fourth contact pair) of the third control subcircuit 202A. A second end of the resistor R5 and a first end of the resistor R6 are connected to the second end (that is, connected to the gate electrode of the MOSFET 3) of the third control subcircuit 202A, and a second end of the resistor R6 is connected to the first end (that is, connected to the source electrode of the MOSFET 3) of the third control subcircuit 202A.

The fourth control subcircuit 202B includes resistor R7 and resistor R8. Resistance values of the resistor R7 and the resistor R8 satisfy the following conditions: $R7*V_D/(R7+R8)<V_{th4}$, and $R7*V_{PoE}/(R7+R8)>V_{th4}$, where $V_{th4}$ is the critical voltage of the MOSFET 4.

A first end of the resistor R7 is connected to the third end (that is, connected to the third contact pair) of the fourth control subcircuit 202B. A second end of the resistor R7 and a first end of the resistor R8 are connected to the second end (that is, connected to the gate electrode of the MOSFET 4) of the fourth control subcircuit 202B, and a second end of the resistor R8 is connected to the first end (that is, connected to the source electrode of the MOSFET 4) of the fourth control subcircuit 202B.

For example, if the second voltage threshold is 26.5V, and the critical voltage of the MOSFET 4 is 5V, R7 whose resistance value is 1 megohm and R8 whose resistance value is 232 kilohms may be selected. In this way, as long as a voltage input from the first contact group, that is, the first voltage, is less than the second voltage threshold 26.5V, the MOSFET 4 is not turned on, in order to avoid generating a reflected voltage on a second wire pair group when a first wire pair group sends a detection voltage.

Based on a detection stage and a power supply stage, the following describes a working principle of the rectifier circuit in this embodiment of the present disclosure by using an example.

During detection, if a detection operation is performed on the first contact group (the contact pair 1-2 and the contact pair 3-6), assuming that an electric potential of the first contact pair 1-2 is lower than that of the second contact pair 3-6, the diode 2 is turned on. Because an absolute value of a PoE detection voltage is less than that of a voltage threshold, an electric potential difference between the gate electrode and the source electrode of the MOSFET 1 is less than the critical voltage of the MOSFET 1, the MOSFET 1 is not turned on, but a body diode in the MOSFET 1 is turned on, and a current may flow to the first contact pair 1-2 through the body diode in the MOSFET 1. In this way, the current flows from the second contact pair 3-6 sequentially through the diode 2, the PD circuit 10, and the body diode in the MOSFET 1 to the first contact pair 1-2. In addition, because the absolute value of the PoE detection voltage is less than that of the voltage threshold, and the other three MOSFETs are not turned on either, a detection current does not pass through the MOSFET 1 to form a reflected voltage. Although a loss is increased because the MOSFET 1 is not turned on, a impose of detection at the detection stage is detecting an effective PD but not providing power supply, and therefore the loss does not cause a negative effect as long as a detection result is not affected.

If a detection operation is performed on the second contact group (the contact pair 4-5 and the contact pair 7-8), assuming that an electric potential of the fourth contact pair 7-8 is lower than that of the third contact pair 4-5, the diode 3 is turned on. Because the absolute value of the PoE detection voltage is less than that of the voltage threshold, an electric potential difference between the gate electrode and the source electrode of the MOSFET 4 is less than the critical voltage of the MOSFET 4, the MOSFET 4 is not turned on, but a body diode in the MOSFET 4 is turned on, and a current may flow to the fourth contact pair 7-8 through the body diode in the MOSFET 4. In this way, the current flows from the third contact pair 4-5 sequentially through the diode 3, the PD circuit 10, and the body diode in the MOSFET 4 to the fourth contact pair 7-8. In addition, because the absolute value of the PoE detection voltage is less than that of the voltage threshold, and the other three MOSFETs are not turned on either, a detection current does not pass through the MOSFET 4 to form a reflected voltage. Although a loss is increased because the MOSFET 4 is not turned on, the purpose of detection at the detection stage is detecting an effective PD but not providing power supply, and therefore the loss does not cause a negative effect as long as a detection result is not affected.

During power supply, if an electric potential of a wire pair 1-2 is lower than that of a wire pair 3-6, an electric potential of the first contact pair 1-2 is lower than that of the second contact pair 3-6, and the diode 2 is turned on. Because the MOSFET 1 is an N-type MOSFET, a high electric potential of the second contact pair 3-6 can make an electric potential of the gate electrode of the MOSFET 1 higher than that of the source electrode of the MOSFET 1, and because an absolute value of a PoE supply voltage is greater than that of the first voltage threshold, an electric potential difference between the gate electrode and the source electrode of the MOSFET 1 is greater than the critical voltage of the MOSFET 1, and therefore the MOSFET 1 is turned on. A current flows from the second contact pair 3-6 sequentially through the diode 2, the PD circuit 10, and the MOSFET 1 (but not the body diode in the MOSFET 1) to the first contact pair 1-2. In this case, an electric potential difference between the gate electrode and the source electrode of the MOSFET 4 is greater than the critical voltage of the MOSFET 4, the MOSFET 4 is also turned on; and a reflected voltage is formed on the fourth contact pair 7-8, but an error is not caused. If the electric potential of the wire pair 1-2 is higher than that of the wire pair 3-6, a current flows from the first contact pair 1-2 sequentially through the diode 1, the PD circuit 10, and the MOSFET 2 (but not a body diode in the MOSFET 2) to the second contact pair 3-6. In this way, at the power supply stage, because a MOSFET is turned on, a current flows back through a diode and the MOSFET, instead of flowing back through two diodes like at the detection stage. This can greatly reduce a power loss at the power supply stage in which a loss is more concerned.

If an electric potential of a wire pair 7-8 is lower than that of a wire pair 4-5, an electric potential of the fourth contact pair 7-8 is lower than that of the third contact pair 4-5, and the diode 3 is turned on. Because the WSJ-ET 4 is an N-type MOSFET, a high electric potential of the third contact pair 4-5 can make an electric potential of the gate electrode of the MOSFET 4 higher than that of the source electrode of the MOSFET 4, and because the absolute value of the PoE supply voltage is greater than that of the second voltage threshold, an electric potential difference between the gate electrode and the source electrode of the MOSFET 4 is greater than the critical voltage of the MOSFET 4, and the MOSFET 4 is turned on. A current flows from the third contact pair 4-5 sequentially through the diode 3, the PD circuit 10, and the MOSFET 4 (but not the body diode in the MOSFET 4) to the fourth contact pair 7-8. In this case, an electric potential difference between the gate electrode and the source electrode of the MOSFET 1 is greater than the critical voltage of the MOSFET 1, the MOSFET 1 is also turned on; and a reflected voltage is formed on the first contact pair 1-2, but an error is not caused. If the electric potential of the wire pair 7-8 is higher than that of the wire pair 4-5, a current flows from the fourth contact pair 7-8 sequentially through the diode 4, the PD circuit 10, and the MOSFET 3 (but not a body diode in the MOSFET 3) to the third contact pair 4-5.

Because the voltage threshold is less than the minimum PoE supply voltage and is greater than the maximum PoE detection voltage, a control circuit in this embodiment of the present disclosure can ensure that: at the power supply stage, a MOSFET is controlled to be turned on, such that power is supplied through the MOSFET, in order to reduce a power loss; and at the detection stage, the MOSFET is controlled not to be turned on, in order to prevent generation of a reflected voltage that causes a detection error.

While reducing costs and a power loss, the PD provided in this embodiment of the present disclosure can also ensure that a detection operation on any contact group can be correctly performed, in order to ensure accuracy of a detection result.

In an implementation, the wire pair 1-2 may be used as a backflow wire pair, or the wire pair 3-6 may be used as a backflow wire pair, and then the wire pair 4-5 or the wire pair 7-8 is connected to a backflow end. In this embodiment of the present disclosure, an example in which the wire pair 3-6 is used as a backflow wire pair and the wire pair 4-5 is connected to the backflow end is used to describe the technical solution of the present disclosure, but is not used to limit the technical solution of the present disclosure.

Figure 4:
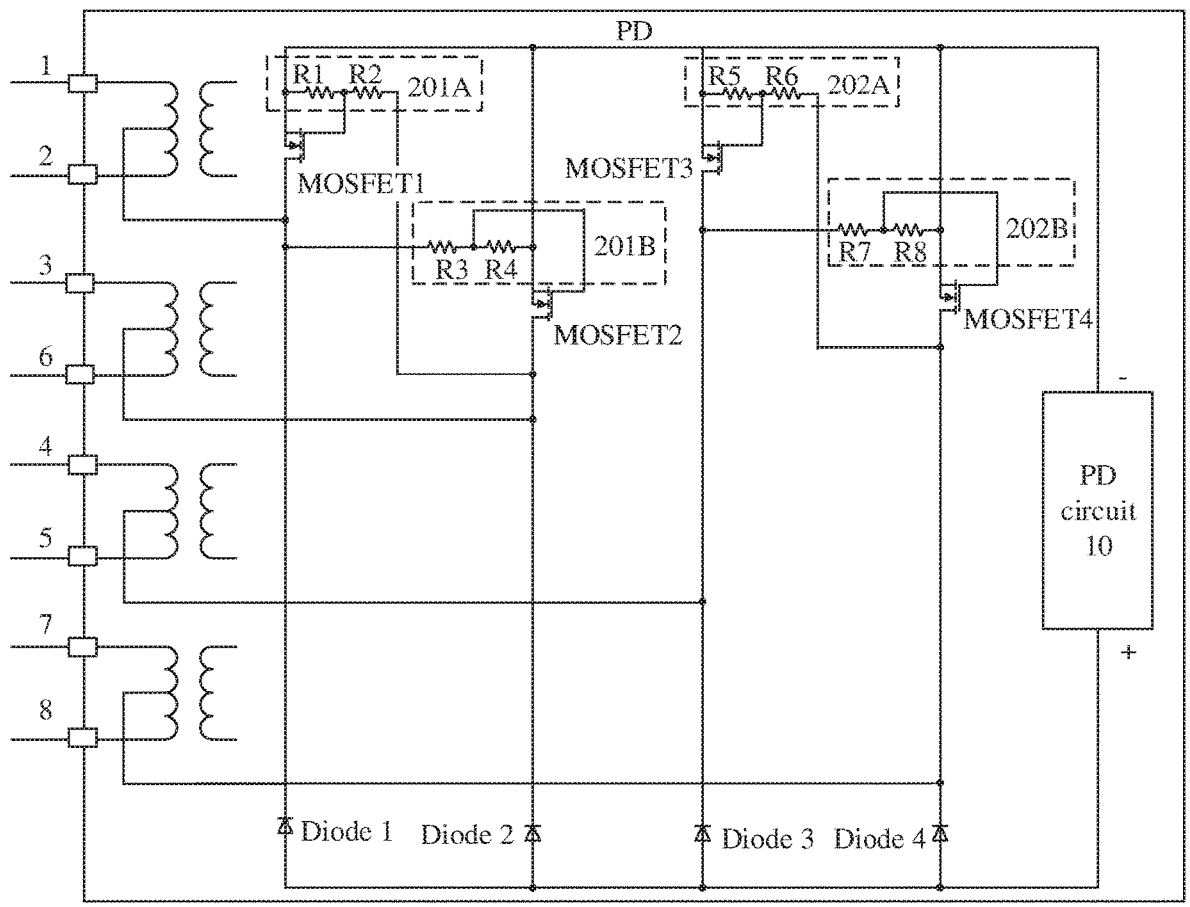
FIG. 4 is a schematic circuit diagram of another PD according to an embodiment of the present disclosure.

FIG. 4 is a schematic circuit diagram of another PD according to an embodiment of the present disclosure. Different from the PD shown in FIG. 3, in the PD shown in FIG. 4, all four MOSFETs are implemented by P-type MOSFETs.

Same as FIG. 3, in FIG. 4, two resistors that are connected in series between contact pairs are also used as a control circuit. The MOSFETs in FIG. 4 are also power MOSFETs.

As described above, the control circuit provided in this embodiment of the present disclosure may be implemented based on a voltage threshold and a critical voltage of a MOSFET by setting resistance values of two resistors in each control subcircuit.

As shown in FIG. 4, the first contact pair is connected to a drain electrode of MOSFET 1, and is connected to a negative electrode (a first end) of the diode 1. The second contact pair is connected to a drain electrode of MOSFET 2, and is connected to a negative electrode (a first end) of the diode 2. The third contact pair is connected to a drain electrode of MOSFET 3, and is connected to a negative electrode (a first end) of the diode 3. The fourth contact pair is connected to a drain electrode of MOSFET 4, and is connected to a negative electrode (a first end) of the diode 4.

A source electrode of the MOSFET 1 is connected to a first end of the first control subcircuit 201A, and a gate electrode of the MOSFET 1 is connected to a second end of the first control subcircuit 201A.

A source electrode of the MOSFET 2 is connected to a first end of the second control subcircuit 201B, and a gate electrode of the MOSFET 2 is connected to a second end of the second control subcircuit 201B.

A source electrode of the MOSFET 3 is connected to a first end of the third control subcircuit 202A, and a gate electrode of the MOSFET 3 is connected to a second end of the third control subcircuit 202A.

A source electrode of the MOSFET 4 is connected to a first end of the fourth control subcircuit 202B, and a gate electrode of the MOSFET 4 is connected to a second end of the fourth control subcircuit 202B.

A first power input end (−) of the PD circuit 10 is connected to the source electrode of the MOSFET 1, the source electrode of the MOSFET 2, the source electrode of the MOSFET 3, and the source electrode of the MOSFET 4. The first power input end (−) of the PD circuit 10 is further connected to a third end of the first control subcircuit 201A, a third end of the second control subcircuit 201B, a third end of the third control subcircuit 202A, and a third end of the fourth control subcircuit 202B.

A second power input end (+) of the PD circuit 10 is connected to a positive electrode (a second end) of the diode 1, a positive electrode (a second end) of the diode 2, a positive electrode (a second end) of the diode 3, and a positive electrode (a second end) of the diode 4.

During power supply, if an electric potential of the wire pair 1-2 is lower than that of the wire pair 3-6, an electric potential of the first contact pair 1-2 is lower than that of the second contact pair 3-6. Because the MOSFET 2 is a P-type MOSFET, a low electric potential of the first contact pair 1-2 can make an electric potential of the gate electrode of the MOSFET 2 lower than that of the source electrode of the MOSFET 2, and because an absolute value of a PoE supply voltage is greater than that of a first voltage threshold, an electric potential difference between the gate electrode and the source electrode of the MOSFET 2 is greater than a critical voltage of the MOSFET 2, and therefore the MOSFET 2 is turned on. A current flows from the second contact pair 3-6 sequentially through the MOSFET 2, the PD circuit 10, and the diode 1 to the first contact pair 1-2. In this case, an electric potential difference between the gate electrode and the source electrode of the MOSFET 3 is greater than a critical voltage of the MOSFET 3, the MOSFET 3 is also turned on. Additionally, a reflected voltage is formed on the fourth contact pair 7-8, but an error is not caused. If the electric potential of the wire pair 1-2 is higher than that of the wire pair 3-6, a current flows from the first contact pair 1-2 sequentially through the MOSFET 1, the PD circuit 10, and the diode 2 to the second contact pair 3-6.

Principles of power supply on the wire pair 4-5 and power supply on the wire pair 7-8 are similar, and details are not described herein.

During detection, if a detection operation is performed on a first contact group (the contact pair 1-2 and the contact pair 3-6), assuming that an electric potential of the first contact pair 1-2 is lower than that of the second contact pair 3-6, because an absolute value of a PoE detection voltage is less than that of a voltage threshold, an electric potential difference between the gate electrode and the source electrode of the MOSFET 2 is less than a critical voltage of the MOSFET 2, the MOSFET 2 is not turned on, but a body diode in the MOSFET 2 is turned on, and a current arrives at the PD circuit 10 through the body diode in the MOSFET 2, and flows through the diode 1 to the first contact pair 1-2. In this way, the current flows from the second contact pair 3-6 sequentially through the body diode in the MOSFET 2, the PD circuit 10, and the diode 1 to the first contact pair 1-2. In addition, because the absolute value of the PoE detection voltage is less than that of the voltage threshold, and the other three MOSFETs are not turned on either, a detection current does not pass through the MOSFET 2 to form a reflected voltage. Although a loss is increased because the MOSFET 2 is not turned on, a purpose of detection at a detection stage is detecting an effective PD but not providing power supply, and therefore the loss does not cause a negative effect. Similarly, a detection operation on a second contact group (the contact pair 4-5 and the contact pair 7-8) may also be correctly performed.

While reducing a power loss, the PD shown in FIG. 4 can also ensure that a detection operation on any contact group can be correctly performed, in order to ensure accuracy of a detection result.

Figure 5:
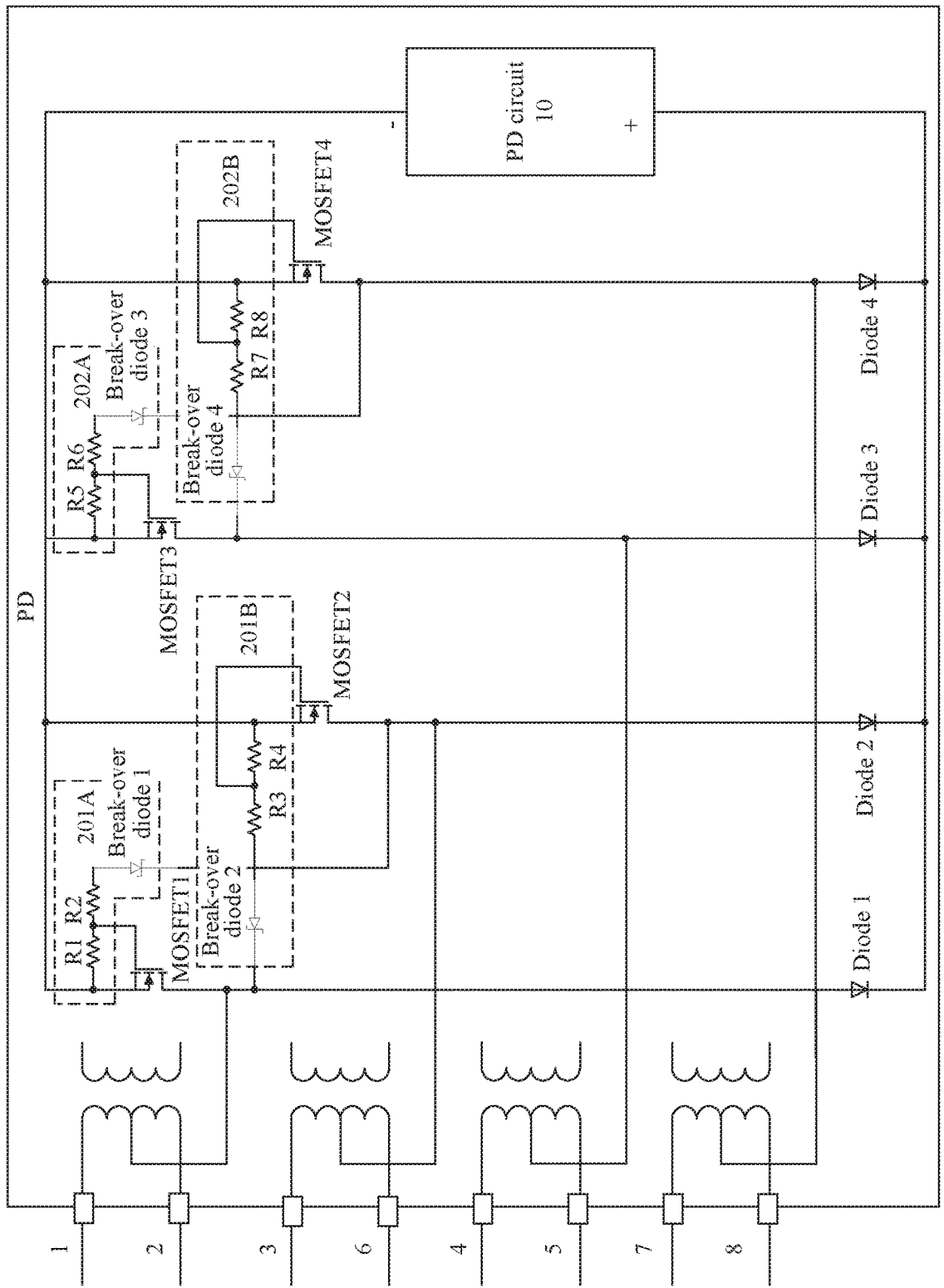
FIG. 5 is a schematic circuit diagram of still another PD according to an embodiment of the present disclosure.

FIG. 5 is a schematic circuit diagram of still another PD according to an embodiment of the present disclosure. Same as the PD shown in FIG. 3, in the PD shown in FIG. 5, all four MOSFETs are N-type MOSFETs. Different from FIG. 3, a control circuit of the PD in FIG. 5 includes resistors and break-over diodes. A suitable break-over diode is selected during design of the PD. For example, the break-over diode may be a Zener diode or an avalanche diode. A breakdown voltage of the break-over diode is the foregoing voltage threshold (the first voltage threshold or the second voltage threshold).

As shown in FIG. 5, a first control subcircuit 201A includes a break-over diode 1, and a second control subcircuit 201B includes a break-over diode 2. A breakdown voltage of the break-over diode 1 and a breakdown voltage of the break-over diode 2 are the first voltage threshold. A third control subcircuit 202A includes a break-over diode 3, and a fourth control subcircuit 202B includes a break-over diode 4. A breakdown voltage of the break-over diode 3 and a breakdown voltage of the break-over diode 4 are the second voltage threshold.

Resistance values of resistor R1 and a resistor R2 in the first control subcircuit satisfy R1*VPoE/(R1+R2)>Vth1, where VPoE is an absolute value of a minimum PoE supply voltage, and Vth1 is a critical voltage of MOSFET 1. Resistance values of resistor R3 and resistor R4 in the second control subcircuit satisfy R3*VPoE/(R3+R4)>Vth2, where Vth2 is a critical voltage of MOSFET 2.

Resistance values of resistor R5 and resistor R6 in the third control subcircuit satisfy R5*VPoE/(R5+R6)>Vth3, where Vth3 is a critical voltage of MOSFET 3. Resistance values of resistor R7 and resistor R8 in the second control subcircuit satisfy R7*VPoE/(R7+R8)>Vth4, where Vth4 is a critical voltage of MOSFET 4.

When a voltage input from a first contact group or a second contact group is a PoE detection voltage, all the four break-over diodes are not turned on, and therefore none of the four MOSFETs is turned on.

When a voltage input from the first contact group is a PoE supply voltage, the break-over diode 1 or the break-over diode 2 in a first control circuit 201 is turned on, and then the first control circuit 201 makes the MOSFET 1 or the MOSFET 2 turned on.

When a voltage input from the second contact group is a PoE supply voltage, the break-over diode 3 or the break-over diode 4 in a second control circuit 202 is turned on, and then the second control circuit 202 makes the MOSFET 3 or the MOSFET 4 turned on.

During power supply, if an electric potential of a wire pair 1-2 is lower than that of a wire pair 3-6, an electric potential of a first contact pair 1-2 is lower than that of a second contact pair 3-6, and the break-over diode 2 is turned on. Because an absolute value of a PoE supply voltage is greater than that of the first voltage threshold, the break-over diode 1 is turned on; and because the MOSFET 1 is an N-type MOSFET, an electric potential difference between a gate electrode and a source electrode of the MOSFET 1 is greater than the critical voltage of the MOSFET 1, and therefore the MOSFET 1 is turned on. A current flows from the second contact pair 3-6 sequentially through the diode 2, a PD circuit 10, and the MOSFET 1 to the first contact pair 1-2. In this case, an electric potential difference between a gate electrode and a source electrode of the MOSFET 4 is greater than the critical voltage of the MOSFET 4, the MOSFET 4 is also turned on; and a reflected voltage is formed on a fourth contact pair 7-8, but an error is not caused. If the electric potential of the wire pair 1-2 is higher than that of the wire pair 3-6, because the absolute value of the PoE supply voltage is greater than that of the first voltage threshold, the break-over diode 2 is turned on, and a current flows from the first contact pair 1-2 sequentially through the diode 1, the PD circuit 10, and the MOSFET 2 to the second contact pair 3-6.

Principles of power supply on a wire pair 4-5 and a wire pair 7-8 are similar, and details are not described herein.

During detection, if a detection operation is performed on the first contact group (the contact pair 1-2 and the contact pair 3-6), assuming that an electric potential of the first contact pair 1-2 is lower than that of the second contact pair 3-6, the break-over diode 2 is turned on. Because an absolute value of a PoE detection voltage is less than that of the first voltage threshold, and the break-over diode 1 is not turned on, the MOSFET 1 is not turned on, but a body diode in the MOSFET 1 is turned on, and a current may flow to the first contact pair 1-2 through the body diode in the MOSFET 1. In addition, because the absolute value of the PoE detection voltage is less than that of the first voltage threshold, and the other three break-over diodes are not turned on either, a detection current does not pass through the MOSFET 4 to form a reflected voltage. This can ensure accuracy of a detection result. Similarly, a detection operation on the second contact group (a contact pair 4-5 and the contact pair 7-8) may also be correctly performed.

A rectifier circuit of the PD shown in FIG. 5 is only an example. In a possible implementation, there may be no resistor in a control circuit, as long as it is ensured that a selected MOSFET is not damaged and can work normally when a voltage input from a contact group is greater than a voltage threshold (which is usually a PoE supply voltage).

While reducing costs and a power loss, the PD shown in FIG. 5 can also ensure that a detection operation on any contact group can be correctly performed, in order to ensure accuracy of a detection result.

Figure 6:
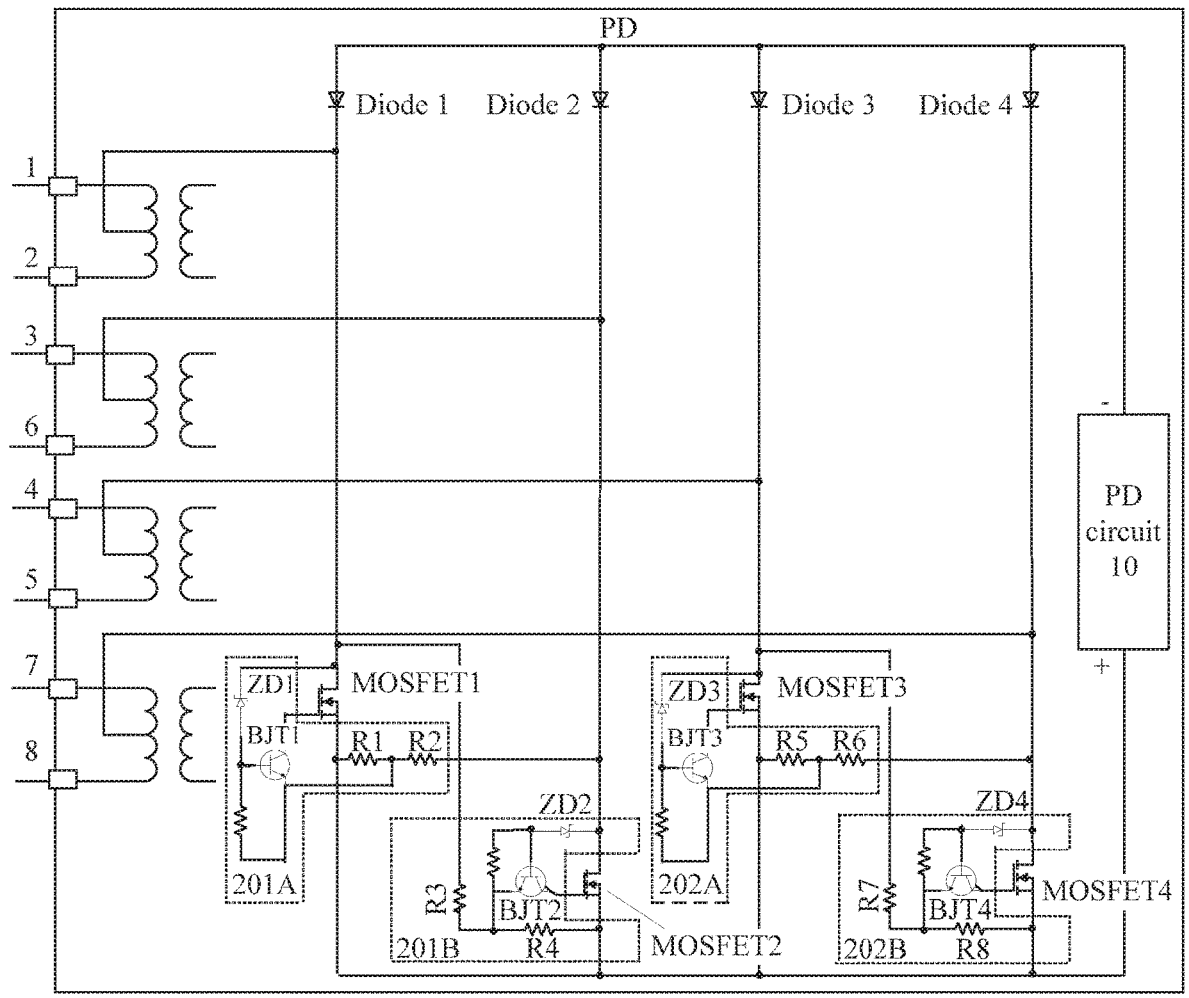
FIG. 6 is a schematic circuit diagram of still another PD according to an embodiment of the present disclosure.

FIG. 6 is a schematic circuit diagram of still another PD according to an embodiment of the present disclosure. Same as the PD shown in FIG. 4, in the PD shown in FIG. 6, all four MOSFETs are P-type MOSFETs. A difference between the PD shown in FIG. 6 and the PD shown in FIG. 5 lies in that a control circuit of the PD in FIG. 6 includes a resistor, a BJT, and a break-over diode. A breakdown voltage of the break-over diode is the foregoing voltage threshold (the first voltage threshold or the second voltage threshold).

In an embodiment, a first control subcircuit 201A includes a break-over diode ZD 1 and a BJT 1, and a second control subcircuit 201B includes a break-over diode ZD 2 and a BJT 2. A breakdown voltage of the ZD 1 and a breakdown voltage of the ZD 2 are the first voltage threshold. A third control subcircuit 202A includes a break-over diode ZD 3 and a BJT 3, and a fourth control subcircuit 202B includes a break-over diode ZD 4 and a BJT 4. A breakdown voltage of the ZD 3 and a breakdown voltage of the ZD 4 are the second voltage threshold.

Resistance values of resistor R1 and a resistor R2 in the first control subcircuit satisfy R1*VPoE/(R1+R2)>Vth1, where VPoE is an absolute value of a minimum PoE supply voltage, and Vth1 is a critical voltage of MOSFET 1. Resistance values of resistor R3 and resistor R4 in the second control subcircuit satisfy R3*VPoE/(R3+R4)>Vth2, where Vth2 is a critical voltage of MOSFET 2.

Resistance values of resistor R5 and resistor R6 in the third control subcircuit satisfy R5*VPoE/(R5+R6)>Vth3, where Vth3 is a critical voltage of MOSFET 3. Resistance values of resistor R7 and resistor R8 in the second control subcircuit satisfy R7*VPoE/(R7+R8)>Vth4, where Vth4 is a critical voltage of MOSFET 4.

When a voltage input from a first contact group or a second contact group is a PoE detection voltage, all the four break-over diodes are not turned on, and therefore none of the four MOSFETs is turned on.

When a voltage input from the first contact group is a PoE supply voltage, the ZD 1 or the ZD 2 in a first control circuit 201 is turned on, and then the first control circuit 201 makes the MOSFET 1 or the MOSFET 2 turned on.

When a voltage input from the second contact group is a PoE supply voltage, the ZD 3 or the ZD 4 in a second control circuit 202 is turned on, and then the second control circuit 202 makes the MOSFET 3 or the MOSFET 4 turned on.

During power supply, if an electric potential of a wire pair 1-2 is lower than that of a wire pair 3-6, an electric potential of a first contact pair 1-2 is lower than that of a second contact pair 3-6. Because an absolute value of a PoE supply voltage is greater than that of the first voltage threshold, the ZD 2 is turned on, and further the BJT 2 is turned on. Because the MOSFET 2 is a P-type MOSFET, a low electric potential of the first contact pair 1-2 can make an electric potential of a gate electrode of the MOSFET 2 less than that of a source electrode of the MOSFET 2, and make an electric potential difference between the gate electrode and the source electrode of the MOSFET 2 greater than the critical voltage of the MOSFET 2, and therefore the MOSFET 2 is turned on. A current flows from the second contact pair 3-6 sequentially through the MOSFET 2, a PD circuit 10, and the diode 1 to the first contact pair 1-2. In this case, an electric potential difference between a gate electrode and a source electrode of the MOSFET 3 is greater than the critical voltage of the MOSFET 3, the MOSFET 3 is also turned on; and a reflected voltage is formed on a fourth contact pair 7-8, but an error is not caused. If the electric potential of the wire pair 1-2 is higher than that of the wire pair 3-6, a current flows from the first contact pair 1-2 sequentially through the MOSFET 1, the PD circuit 10, and the diode 2 to the second contact pair 3-6.

Principles of power supply on a wire pair 4-5 and a wire pair 7-8 are similar, and details are not described herein.

During detection, if a detection operation is performed on the first contact group (the contact pair 1-2 and the contact pair 3-6), assuming that an electric potential of the first contact pair 1-2 is lower than that of the second contact pair 3-6, because an absolute value of a PoE detection voltage is less than that of the first voltage threshold, the ZD 2 is not turned on, and the MOSFET 2 is also not turned on; but a body diode in the MOSFET 2 is turned on, and a current arrives at the PD circuit 10 through the body diode in the MOSFET 2, and flows through the diode 1 to the first contact pair 1-2. In this way, the current flows from the second contact pair 3-6 sequentially through the body diode in the MOSFET 2, the PD circuit 10, and the diode 1 to the first contact pair 1-2. In addition, because the absolute value of the PoE detection voltage is less than that of the voltage threshold, and none of the other three break-over diodes (the ZD 1, the ZD 3, and the ZD 4) is turned on, a detection current does not pass through the MOSFET 4 to form a reflected voltage. Similarly, a detection operation on the second contact group (a contact pair 4-5 and the contact pair 7-8) may also be correctly performed.

Likewise, there may be no resistor in each control sub-circuit shown in FIG. 6.

Some other components, for example, a capacitor, a resistor, a break-over diode, and a BJT may be added to a rectifier circuit of the PD provided in this embodiment of the present disclosure.

Because the voltage threshold is less than the minimum PoE supply voltage and is greater than a maximum PoE detection voltage, a control circuit in this embodiment of the present disclosure can ensure: at a power supply stage, a MOSFET is turned on, such that power is supplied through a MOSFET, in order to reduce a power loss; and at a detection stage, the MOSFET is not turned on, in order to prevent generation of a reflected voltage that causes a detection error.

While reducing costs and a power loss, the PD provided in this embodiment of the present disclosure can also ensure that a detection operation on any contact group can be correctly performed.

For the PD provided in this embodiment of the present disclosure, only an example description of connection relationships and functions of devices, modules, and the like related to the present disclosure is provided. A person skilled in the art may understand that, based on a function and a service requirement, the PD may further include another device. This is not limited in the present disclosure.

Based on similar inventive concepts disclosed herein, an embodiment of the present disclosure further provides a PoE system. The PoE system includes PSE and the PD provided in the embodiments of the present disclosure. The PSE is connected to the PD through an Ethernet cable.

A person of ordinary skill in the art may understand that all or some of the steps of the method embodiments may be implemented by a program instructing relevant hardware. The program may be stored in a computer readable storage medium. The storage medium may include a random access memory, a read-only memory, a flash memory, a hard disk, a solid state disk, or an optical disc.

The foregoing descriptions are merely example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A powered device (PD) for power over Ethernet (PoE), the PD comprising:
    an Ethernet port comprising a first contact group and a second contact group;
    a rectifier circuit connected to the Ethernet port, wherein the rectifier circuit comprises four metal-oxide semiconductor field-effect transistor (MOSFETs) and four diodes, each of the four MOSFETs being connected to a diode of the four diodes, wherein the four MOSFETs include a first MOSFET, a second MOSFET, a third MOSFET, and a fourth MOSFET; and
    a PD circuit connected to the rectifier circuit, wherein the rectifier circuit further comprises a first control circuit and a second control circuit,
    wherein the first control circuit is configured to:
        refrain from turning on the first MOSFET and the second MOSFET when a first voltage is less than a first voltage threshold; and
        turn on at least one of the first MOSFET or the second MOSFET when the first voltage is greater than the first voltage threshold, wherein the first voltage is a voltage input from the first contact group, wherein the second control circuit is configured to:
turn on at least one of the third MOSFET or the fourth MOSFET when a second voltage is greater than a second voltage threshold; and
refrain from turning on the third MOSFET and the fourth MOSFET when the first voltage is less than the second voltage threshold, wherein the second voltage is a voltage input from the second contact group,
wherein the first control circuit comprises a first control subcircuit configured to regain from turning on the first MOSFET and the second MOSFET such that when an electric potential difference between a third end of the first control subcircuit and a first end of the first control subcircuit is less than the first voltage threshold, the first MOSFET does not turn on when the first control subcircuit makes the electric potential difference between a gate electrode of the first MOSFET and a source electrode of the first MOSFET less than a critical voltage of the first MOSFET.

2. The PD of claim 1, wherein the first control circuit is further configured to refrain from turning on the first MOSFET and the second MOSFET such that when the electric potential difference between the third and first ends of the first control subcircuit is less than the first voltage threshold, a reflected voltage is not generated through the first MOSFET at a detection stage when the first control subcircuit makes the electric potential difference between the gate electrode and the source electrode less than the critical voltage of the first MOSFET.

3. The PD of claim 1, wherein the first control circuit is further configured to refrain from turning on the first MOSFET and the second MOSFET when the second voltage is less than the first voltage threshold, and wherein the second control circuit is further configured to refrain from turning on the third MOSFET and the fourth MOSFET when the second voltage is less than the second voltage threshold.

4. The PD of claim 1, wherein the first contact group comprises a first contact pair and a second contact pair, wherein the second contact group comprises a third contact pair and a fourth contact pair, wherein the first voltage is an electric potential difference between the first contact pair and the second contact pair, and wherein the second voltage is an electric potential difference between the third contact pair and the fourth contact pair, wherein the four diodes comprise a first diode, a second diode, a third diode, and a fourth diode, wherein the first control circuit further comprises a second control subcircuit, and wherein the second control circuit comprises a third control subcircuit and a fourth control subcircuit, wherein the first contact pair is connected to a drain electrode of the first MOSFET and a first end of the first diode, wherein the second contact pair is connected to a drain electrode of the second MOSFET and a first end of the second diode, wherein the third contact pair is connected to a drain electrode of the third MOSFET and a first end of the third diode, wherein the fourth contact pair is connected to a drain electrode of the fourth MOSFET and a first end of the fourth diode, wherein the gate electrode of the first MOSFET is connected to a second end of the first control subcircuit, and wherein the source electrode of the first MOSFET is connected to the first end of the first control subcircuit, wherein a gate electrode of the second MOSFET is connected to a second end of the second control subcircuit, and wherein a source electrode of the second MOSFET is connected to a first end of the second control subcircuit, wherein a gate electrode of the third MOSFET is connected to a second end of the third control subcircuit, and wherein a source electrode of the third MOSFET is connected to a first end of the third control subcircuit, wherein a gate electrode of the fourth MOSFET is connected to a second end of the fourth control subcircuit, and wherein a source electrode of the fourth MOSFET is connected to a first end of the fourth control subcircuit, wherein a first power input end of the PD circuit is connected to the source electrode of the first MOSFET, the source electrode of the second MOSFET, the source electrode of the third MOSFET, and the source electrode of the fourth MOSFET, wherein a second power input end of the PD circuit is connected to a second end of the first diode, a second end of the second diode, a second end of the third diode, and a second end of the fourth diode, wherein the third end of the first control subcircuit is connected to the second contact pair, wherein a third end of the second control subcircuit is connected to the first contact pair, wherein a third end of the third control subcircuit is connected to the fourth contact pair, wherein a third end of the fourth control subcircuit is connected to the third contact pair, wherein the first control subcircuit is configured such that when making an electric potential difference between the third end of the first control subcircuit and the first end of the first control subcircuit less than the first voltage threshold, the first control subcircuit makes an electric potential difference between the gate electrode of the first MOSFET and the source electrode of the first MOSFET less than a critical voltage of the first MOSFET, wherein the second control subcircuit is configured such that when making an electric potential difference between the third end of the second control subcircuit and the first end of the second control subcircuit less than the first voltage threshold, the second control subcircuit makes an electric potential difference between the gate electrode of the second MOSFET and the source electrode of the second MOSFET less than a critical voltage of the second MOSFET, wherein the third control subcircuit is configured such that when making an electric potential difference between the third end of the third control subcircuit and the first end of the third control subcircuit less than the second voltage threshold, the third control subcircuit makes an electric potential difference between the gate electrode of the third MOSFET and the source electrode of the third MOSFET less than a critical voltage of the third MOSFET, and wherein the fourth control subcircuit is configured such that when making an electric potential difference between the third end of the fourth control subcircuit and the first end of the fourth control subcircuit less than the second voltage threshold, the fourth control subcircuit makes an electric potential difference between the gate electrode of the fourth MOSFET and the source electrode of the fourth MOSFET less than a critical voltage of the fourth MOSFET.

5. The PD of claim 1, wherein the second control circuit is further configured to refrain from turning on the third MOSFET and the fourth MOSFET when the second voltage is less than the second voltage threshold, wherein the first contact group comprises a first contact pair and a second contact pair, wherein the second contact group comprises a third contact pair and a fourth contact pair, wherein the first voltage is an electric potential difference between the first contact pair and the second contact pair, and wherein the second voltage is an electric potential difference between the third contact pair and the fourth contact pair.

6. The PD of claim 1, wherein the first contact group comprises a first contact pair and a second contact pair, wherein the second contact group comprises a third contact pair and a fourth contact pair, wherein the first voltage is an electric potential difference between the first contact pair and the second contact pair, wherein the second voltage is an electric potential difference between the third contact pair and the fourth contact pair, wherein the four diodes comprise a first diode, a second diode, a third diode, and a fourth diode, wherein the first control circuit comprises a second control subcircuit, and wherein the second control circuit comprises a third control subcircuit and a fourth control subcircuit, wherein the first contact pair is connected to a drain electrode of the first MOSFET and a first end of the first diode, wherein the second contact pair is connected to a drain electrode of the second MOSFET and a first end of the second diode, wherein the third contact pair is connected to a drain electrode of the third MOSFET and a first end of the third diode, wherein the fourth contact pair is connected to a drain electrode of the fourth MOSFET and a first end of the fourth diode, wherein the gate electrode of the first MOSFET is connected to a second end of the first control subcircuit, and wherein the source electrode of the first MOSFET is connected to the first end of the first control subcircuit, wherein a gate electrode of the second MOSFET is connected to a second end of the second control subcircuit, and wherein a source electrode of the second MOSFET is connected to a first end of the second control subcircuit, wherein a gate electrode of the third MOSFET is connected to a second end of the third control subcircuit, and wherein a source electrode of the third MOSFET is connected to a first end of the third control subcircuit, wherein a gate electrode of the fourth MOSFET is connected to a second end of the fourth control subcircuit, and wherein a source electrode of the fourth MOSFET is connected to a first end of the fourth control subcircuit, wherein a first power input end of the PD circuit is connected to the source electrode of the first MOSFET, the source electrode of the second MOSFET, the source electrode of the third MOSFET, and the source electrode of the fourth MOSFET, wherein a second power input end of the PD circuit is connected to a second end of the first diode, a second end of the second diode, a second end of the third diode, and a second end of the fourth diode, wherein the third end of the first control subcircuit is connected to the second contact pair, wherein a third end of the second control subcircuit is connected to the first contact pair, wherein a third end of the third control subcircuit is connected to the fourth contact pair, wherein a third end of the fourth control subcircuit is connected to the third contact pair, wherein the first control subcircuit is configured such that when making an electric potential difference between the third end of the first control subcircuit and the first end of the first control subcircuit less than the first voltage threshold, the first control subcircuit makes an electric potential difference between the gate electrode of the first MOSFET and the source electrode of the first MOSFET less than a critical voltage of the first MOSFET, wherein the second control subcircuit is configured such that when making an electric potential difference between the third end of the second control subcircuit and the first end of the second control subcircuit less than the first voltage threshold, the second control subcircuit makes an electric potential difference between the gate electrode of the second MOSFET and the source electrode of the second MOSFET less than a critical voltage of the second MOSFET, wherein the third control subcircuit is configured such that when making an electric potential difference between the third end of the third control subcircuit and the first end of the third control subcircuit less than the second voltage threshold, the third control subcircuit makes an electric potential difference between the gate electrode of the third MOSFET and the source electrode of the third MOSFET less than a critical voltage of the third MOSFET, and wherein the fourth control subcircuit is configured such that when making an electric potential difference between the third end of the fourth control subcircuit and the first end of the fourth control subcircuit less than the second voltage threshold, the fourth control subcircuit makes an electric potential difference between the gate electrode of the fourth MOSFET and the source electrode of the fourth MOSFET less than a critical voltage of the fourth MOSFET.

7. The PD of claim 1, wherein the first contact group comprises a first contact pair and a second contact pair, wherein the second contact group comprises a third contact pair and a fourth contact pair, wherein the first control subcircuit comprises a first resistor and a second resistor, wherein a first end of the first resistor is connected to the first contact pair, wherein both a second end of the first resistor and a first end of the second resistor are connected to a gate electrode of the second MOSFET, wherein a second end of the second resistor is connected to a source electrode of the second MOSFET, wherein the first control circuit further comprises a second control subcircuit, wherein the second control subcircuit comprises a third control subcircuit, a fourth control subcircuit, a third resistor, and a fourth resistor, wherein a first end of the third resistor is connected to the second contact pair, wherein both a second end of the third resistor and a first end of the fourth resistor are connected to the gate electrode of the first MOSFET, wherein a second end of the fourth resistor is connected to the source electrode of the first MOSFET, wherein the third control subcircuit comprises a fifth resistor and a sixth resistor, wherein a first end of the fifth resistor is connected to the third contact pair, wherein both a second end of the fifth resistor and a first end of the sixth resistor are connected to the gate electrode of the fourth MOSFET, wherein a second end of the sixth resistor is connected to a source electrode of the fourth MOSFET, wherein the fourth control subcircuit comprises a seventh resistor and an eighth resistor, wherein a first end of the seventh resistor is connected to the fourth contact pair, wherein both a second end of the seventh resistor and a first end of the eighth resistor are connected to a gate electrode of the third MOSFET, and wherein a second end of the eighth resistor is connected to a source electrode of the third MOSFET, wherein resistance values of the first resistor and the second resistor satisfy the following conditions: $R1*V_D/(R1+R2)<V_{th1}$ and $R1*V_{PoE}/(R1+R2)>V_{th1}$, where R1 is a resistance value of the first resistor, R2 is a resistance value of the second resistor, where $V_{th1}$ is the critical voltage of the first MOSFET, where $V_D$ is an absolute value of a maximum PoE detection voltage, and where $V_{PoE}$ is an absolute value of a minimum PoE supply voltage, wherein resistance values of the third resistor and the fourth resistor satisfy the following conditions: $R3*V_D/(R3+R4)<V_{th2}$ and $R3*V_{PoE}/(R3+R4)>V_{th2}$, where R3 is a resistance value of the third resistor, where R4 is a resistance value of the fourth resistor, and where $V_{th2}$ is the critical voltage of the second MOSFET, wherein resistance values of the fifth resistor and the sixth resistor satisfy the following conditions: $R5*V_D/(R5+R6)<V_{th3}$ and $R5*V_{PoE}/(R5+R6)>V_{th3}$, where R5 is a resistance value of the fifth resistor, where R6 is a resistance value of the sixth resistor, and where $V_{th3}$ is the critical voltage of the third MOSFET, and wherein resistance values of the seventh resistor and the eighth resistor satisfy the following conditions: $R7*V_D/(R7+R8)<V_{th4}$ and $R7*V_{PoE}/(R7+R8)>V_{th4}$, where R7 is a resistance value of the seventh resistor, where R8 is a resistance value of the eighth resistor, and where $V_{th4}$ is the critical voltage of the fourth MOSFET.

8. The PD of claim 1, wherein the first contact group comprises a first contact pair and a second contact pair, wherein the second contact group comprises a third contact pair and a fourth contact pair, wherein the first control subcircuit comprises a first break-over diode, wherein a negative electrode of the first break-over diode is connected to the second contact pair, wherein a positive electrode of the first break-over diode is connected to the gate electrode of the first MOSFET, wherein the first control circuit further comprises a second control subcircuit, wherein the second control subcircuit comprises a third control subcircuit, a fourth control subcircuit, and a second break-over diode, wherein a negative electrode of the second break-over diode is connected to the first contact pair, wherein a positive electrode of the second break-over diode is connected to a gate electrode of the second MOSFET, wherein the third control subcircuit comprises a third break-over diode, wherein a negative electrode of the third break-over diode is connected to the fourth contact pair, wherein a positive electrode of the third break-over diode is connected to a gate electrode of the third MOSFET, wherein the fourth control subcircuit comprises a fourth break-over diode, wherein a negative electrode of the fourth break-over diode is connected to the third contact pair, wherein a positive electrode of the fourth break-over diode is connected to a gate electrode of the fourth MOSFET, wherein both a critical voltage of the first break-over diode and a critical voltage of the second break-over diode are the first voltage threshold, and wherein both a critical voltage of the third break-over diode and a critical voltage of the fourth break-over diode are the second voltage threshold.

9. A power supply system, comprising:
a power supply device; and
a powered device (PD) connected to the power supply device through an Ethernet cable, wherein the PD comprises an Ethernet port, a rectifier circuit connected to the Ethernet port, and a PD circuit connected to the rectifier circuit,
wherein the Ethernet port comprises a first contact group and a second contact group,
wherein the rectifier circuit comprises four metal-oxide semiconductor field-effect transistor (MOSFETs) and four diodes, each of the four MOSFETs being connected to a diode of the four diodes, wherein the four MOSFETs include a first MOSFET, a second MOSFET, a third MOSFET, a fourth MOSFET, wherein the rectifier circuit further comprises a first control circuit, and a second control circuit,
wherein the first control circuit is configured to:
refrain from turning on the first MOSFET and the second MOSFET when a first voltage is less than a first voltage threshold; and
turn on at least one of the first MOSFET or the second MOSFET when the first voltage is greater than the first voltage threshold, wherein the first voltage is a voltage input from the first contact group,
wherein the second control circuit is configured to:
turn on at least one of the third MOSFET or the fourth MOSFET when a second voltage is greater than a second voltage threshold; and
refrain from turning on the third MOSFET and the fourth MOSFET when the first voltage is less than the second voltage threshold, wherein the second voltage is a voltage input from the second contact group,
wherein the first control circuit comprises a first control subcircuit configured to regain from turning on the first MOSFET and the second MOSFET such that when an electric potential difference between a third end of the first control subcircuit and a first end of the first control subcircuit is less than the first voltage threshold, the first MOSFET does not turn on when the first control subcircuit makes the electric potential difference between a gate electrode of the first MOSFET and a source electrode of the first MOSFET less than a critical voltage of the first MOSFET.

10. The power supply system of claim 9, wherein the first control circuit is further configured to refrain from turning on the first MOSFET and the second MOSFET when the second voltage is less than the first voltage threshold, and wherein the second control circuit is further configured to refrain from turning on the third MOSFET and the fourth MOSFET when the second voltage is less than the second voltage threshold.

11. The power supply system of claim 9, wherein the first contact group comprises a first contact pair and a second contact pair, wherein the second contact group comprises a third contact pair and a fourth contact pair, wherein the first voltage is an electric potential difference between the first contact pair and the second contact pair, wherein the second voltage is an electric potential difference between the third contact pair and the fourth contact pair, wherein the four diodes comprise a first diode, a second diode, a third diode, and a fourth diode,
wherein the first control circuit further comprises a second control subcircuit, wherein the second control circuit comprises a third control subcircuit and a fourth control subcircuit,
wherein the first contact pair is connected to a drain electrode of the first MOSFET and a first end of the first diode, wherein the second contact pair is connected to a drain electrode of the second MOSFET and a first end of the second diode, wherein the third contact pair is connected to a drain electrode of the third MOSFET and a first end of the third diode, wherein the fourth contact pair is connected to a drain electrode of the fourth MOSFET and a first end of the fourth diode,
wherein the gate electrode of the first MOSFET is connected to a second end of the first control subcircuit, wherein the source electrode of the first MOSFET is connected to the first end of the first control subcircuit, wherein a gate electrode of the second MOSFET is connected to a second end of the second control subcircuit, wherein a source electrode of the second MOSFET is connected to a first end of the second control subcircuit, wherein a gate electrode of the third MOSFET is connected to a second end of the third control subcircuit, wherein a source electrode of the third MOSFET is connected to a first end of the third control subcircuit, wherein a gate electrode of the fourth MOSFET is connected to a second end of the fourth control subcircuit, wherein a source electrode of the fourth MOSFET is connected to a first end of the fourth control subcircuit, wherein a first power input end of the PD circuit is connected to the source electrode of the first MOSFET, the source electrode of the second MOSFET, the source electrode of the third MOSFET, and the source electrode of the fourth MOSFET, wherein a second power input end of the PD circuit is connected to a second end of the first diode, a second end of the second diode, a second end of the third diode, and a second end of the fourth diode, wherein the third end of the first control subcircuit is connected to the second contact pair, wherein a third end of the second control subcircuit is connected to the first contact pair, wherein a third end of the third control subcircuit is connected to the fourth contact pair, wherein a third end of the fourth control subcircuit is connected to the third contact pair, wherein the second control subcircuit is configured such that when making an electric potential difference between the third end of the second control subcircuit and the first end of the second control subcircuit less than the first voltage threshold, the second control subcircuit makes an electric potential difference between the gate electrode of the second MOSFET and the source electrode of the second MOSFET less than a critical voltage of the second MOSFET, wherein the third control subcircuit is configured such that when making an electric potential difference between the third end of the third control subcircuit and the first end of the third control subcircuit less than the second voltage threshold, the third control subcircuit makes an electric potential difference between the gate electrode of the third MOSFET and the source electrode of the third MOSFET less than a critical voltage of the third MOSFET, and wherein the fourth control subcircuit is configured such that when making an electric potential difference between the third end of the fourth control subcircuit and the first end of the fourth control subcircuit less than the second voltage threshold, the fourth control subcircuit makes an electric potential difference between the gate electrode of the fourth MOSFET and the source electrode of the fourth MOSFET less than a critical voltage of the fourth MOSFET.

12. The power supply system of claim 9, wherein the first contact group comprises a first contact pair and a second contact pair, wherein the second contact group comprises a third contact pair and a fourth contact pair, wherein the first control subcircuit comprises a first resistor and a second resistor, wherein a first end of the first resistor is connected to the first contact pair, wherein both a second end of the first resistor and a first end of the second resistor are connected to the gate electrode of the second MOSFET, wherein a second end of the second resistor is connected to the source electrode of the second MOSFET, wherein the first control circuit further comprises a second control subcircuit, wherein the second control subcircuit comprises a third control subcircuit, a fourth control subcircuit, a third resistor, and a fourth resistor, wherein a first end of the third resistor is connected to the second contact pair, wherein both a second end of the third resistor and a first end of the fourth resistor are connected to the gate electrode of the first MOSFET, wherein a second end of the fourth resistor is connected to the source electrode of the first MOSFET, wherein the third control subcircuit comprises a fifth resistor and a sixth resistor, wherein a first end of the fifth resistor is connected to the third contact pair, wherein both a second end of the fifth resistor and a first end of the sixth resistor are connected to a gate electrode of the fourth MOSFET, wherein a second end of the sixth resistor is connected to a source electrode of the fourth MOSFET, wherein the fourth control subcircuit comprises a seventh resistor and an eighth resistor, wherein a first end of the seventh resistor is connected to the fourth contact pair, wherein both a second end of the seventh resistor and a first end of the eighth resistor are connected to a gate electrode of the third MOSFET, wherein a second end of the eighth resistor is connected to a source electrode of the third MOSFET, wherein resistance values of the first resistor and the second resistor satisfy the following conditions: $R1*V_D/(R1+R2)<V_{th1}$ and $R1*V_{PoE}/(R1+R2)>V_{th1}$, where R1 is a resistance value of the first resistor, where R2 is a resistance value of the second resistor, where $V_{th1}$ is the critical voltage of the first MOSFET, where $V_D$ is an absolute value of a maximum power over Ethernet (PoE) detection voltage, and where $V_{PoE}$ is an absolute value of a minimum PoE supply voltage, wherein resistance values of the third resistor and the fourth resistor satisfy the following conditions: $R3*V_D/(R3+R4)<V_{th2}$ and $R3*V_{PoE}/(R3+R4)>V_{th2}$, where R3 is a resistance value of the third resistor, where R4 is a resistance value of the fourth resistor, and where $V_{th2}$ is the critical voltage of the second MOSFET, wherein resistance values of the fifth resistor and the sixth resistor satisfy the following conditions: $R5*V_D/(R5+R6)<V_{th3}$ and $R5*V_{PoE}/(R5+R6)>V_{th3}$, where R5 is a resistance value of the fifth resistor, where R6 is a resistance value of the sixth resistor, and where $V_{th3}$ is the critical voltage of the third MOSFET, and wherein resistance values of the seventh resistor and the eighth resistor satisfy the following conditions: $R7*V_D/(R7+R8)<V_{th4}$ and $R7*V_{PoE}/(R7+R8)>V_{t}m$, where R7 is a resistance value of the seventh resistor, where R8 is a resistance value of the eighth resistor, and where $V_{th4}$ is the critical voltage of the fourth MOSFET.

13. The power supply system of claim 9, wherein the first contact group comprises a first contact pair and a second contact pair, wherein the second contact group comprises a third contact pair and a fourth contact pair, wherein the first control subcircuit comprises a first break-over diode, wherein a negative electrode of the first break-over diode is connected to the second contact pair, wherein a positive electrode of the first break-over diode is connected to the gate electrode of the first MOSFET, wherein the first control circuit further comprises a second control subcircuit, wherein the second control subcircuit comprises a third control subcircuit, a fourth control subcircuit, and a second break-over diode, wherein a negative electrode of the second break-over diode is connected to the first contact pair, wherein a positive electrode of the second break-over diode is connected to a gate electrode of the second MOSFET, wherein the third control subcircuit further comprises a third break-over diode, wherein a negative electrode of the third break-over diode is connected to the fourth contact pair, wherein a positive electrode of the third break-over diode is connected to a gate electrode of the third MOSFET, wherein the fourth control subcircuit further comprises a fourth break-over diode, wherein a negative electrode of the fourth break-over diode is connected to the third contact pair, wherein a positive electrode of the fourth break-over diode is connected to a gate electrode of the fourth MOSFET, wherein both a critical voltage of the first break-over diode and a critical voltage of the second break-over diode are the first voltage threshold, and wherein both a critical voltage of the third break-over diode and a critical voltage of the fourth break-over diode are the second voltage threshold.

14. The power supply system of claim 9, wherein the second control circuit is further configured to refrain from turning on the third MOSFET and the fourth MOSFET when the second voltage is less than the second voltage threshold.

15. The power supply system of claim 9, wherein the first contact group comprises a first contact pair and a second contact pair, wherein the second contact group comprises a third contact pair and a fourth contact pair, wherein the first voltage is an electric potential difference between the first contact pair and the second contact pair, wherein the second voltage is an electric potential difference between the third contact pair and the fourth contact pair, wherein the four diodes comprise a first diode, a second diode, a third diode, and a fourth diode, wherein the first control circuit comprises a second control subcircuit, and wherein the second control circuit comprises a third control subcircuit and a fourth control subcircuit.

16. The power supply system of claim 15, wherein the first contact pair is connected to a drain electrode of the first MOSFET and a first end of the first diode, wherein the second contact pair is connected to a drain electrode of the second MOSFET, and a first end of the second diode, wherein the third contact pair is connected to a drain electrode of the third MOSFET and a first end of the third diode, and wherein the fourth contact pair is connected to a drain electrode of the fourth MOSFET and a first end of the fourth diode.

17. The power supply system of claim 16, wherein the gate electrode of the first MOSFET is connected to a second end of the first control subcircuit, wherein the source electrode of the first MOSFET is connected to the first end of the first control subcircuit, wherein a gate electrode of the second MOSFET is connected to a second end of the second control subcircuit, wherein a source electrode of the second MOSFET is connected to a first end of the second control subcircuit, wherein a gate electrode of the third MOSFET is connected to a second end of the third control subcircuit, wherein a source electrode of the third MOSFET is connected to a first end of the third control subcircuit, wherein a gate electrode of the fourth MOSFET is connected to a second end of the fourth control subcircuit, and wherein a source electrode of the fourth MOSFET is connected to a first end of the fourth control subcircuit.

18. The power supply system of claim 9, wherein the first contact group comprises a first contact pair and a second contact pair, wherein the second contact group comprises a third contact pair and a fourth contact pair, wherein the four diodes comprise a first diode, a second diode, a third diode, and a fourth diode, wherein a first power input end of the PD circuit is connected to the source electrode of the first MOSFET, a source electrode of the second MOSFET, a source electrode of the third MOSFET, and a source electrode of the fourth MOSFET, wherein a second power input end of the PD circuit is connected to a second end of the first diode, a second end of the second diode, a second end of the third diode, and a second end of the fourth diode, wherein the first control circuit further comprises a second control subcircuit, a third control subcircuit, and a fourth control subcircuit, wherein the third end of the first control subcircuit is connected to the second contact pair, wherein a third end of the second control subcircuit is connected to the first contact pair, wherein a third end of the third control subcircuit is connected to the fourth contact pair, and wherein a third end of the fourth control subcircuit is connected to the third contact pair.

19. The power supply system of claim 9, wherein the first control circuit further comprises a second control subcircuit.

20. The power supply system of claim 19, wherein the second control subcircuit is configured such that when making an electric potential difference between a third end of the second control subcircuit and a first end of the second control subcircuit less than the first voltage threshold, the second control subcircuit makes an electric potential difference between a gate electrode of the second MOSFET and a source electrode of the second MOSFET less than a critical voltage of the second MOSFET.

* * * * *

UNITED STATES PATENT AND TRADEMARK OFFICE
CERTIFICATE OF CORRECTION

PATENT NO. : 10,887,117 B2  
APPLICATION NO. : 16/422268  
DATED : January 5, 2021  
INVENTOR(S) : Jincan Cao and Yonghuan Ding It is certified that error appears in the above-identified patent and that said Letters Patent is hereby corrected as shown below:

In the Claims

Claim 1, Column 19, Line 11: "to regain from turning" should read "to refrain from turning"

Claim 9, Column 24, Line 12: "to regain from turning" should read "to refrain from turning"

Claim 12, Column 26, Line 40: "$(R7+R8) > V_tm$," should read "$(R7+R8) > V_{th4}$,"

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*